(12) United States Patent
Ohsawa et al.

(10) Patent No.: US 6,285,531 B1
(45) Date of Patent: Sep. 4, 2001

(54) MAGNETIC HEAD WITH MAGNETO-RESISTANCE EFFECT ELEMENT DISPOSED ON OPPOSITE SIDE OF MAGNETIC CORE PAIR FROM RECORDING COIL

(75) Inventors: Yuichi Ohsawa, Tokyo; Hiroaki Yoda; Akio Hori, both of Kawasaki; Masatoshi Yoshikawa; Masashi Sahashi, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/040,353

(22) Filed: Mar. 16, 1998

(30) Foreign Application Priority Data

Mar. 17, 1997 (JP) .................................................. 9-062624

(51) Int. Cl.⁷ ...................................................... G11B 5/39
(52) U.S. Cl. ............................................ 360/317; 360/321
(58) Field of Search ................................... 360/113, 317, 360/321

(56) References Cited

U.S. PATENT DOCUMENTS

| | | | |
|---|---|---|---|
| 4,698,711 | 10/1987 | Vinal | 360/113 |
| 5,486,967 | * 1/1996 | Tanaka et al. | 360/113 |
| 5,726,839 | * 3/1998 | Shinohara et al. | 360/113 |
| 5,920,447 | * 7/1999 | Sakata et al. | 360/121 |

FOREIGN PATENT DOCUMENTS 0 702 357 * 3/1996 (EP) .

* cited by examiner

Primary Examiner—Craig A. Renner
(74) Attorney, Agent, or Firm—Oblon, Spivak, McClelland, Maier & Neustadt, P.C.

(57) ABSTRACT

A magnetic head has a recording magnetic yoke on the side of an air bearing surface of which a recording magnetic gap film is interposed and a reproducing magnetic yoke on the side of an air bearing surface of which a reproducing magnetic gap film is interposed. The magnetic yoke can serve concurrently for recording/reproducing. A recording coil supplying a recording magnetic flux to a recording medium through a recording magnetic yoke is disposed along one main surface of a magnetic yoke. An MR element in which a signal magnetic flux is led from a recording medium through a reproducing magnetic yoke is disposed along the other main surface on opposite side from a recording coil of a magnetic yoke. Or, at least on extension of a film plane of a magnetic gap film, a ferromagnetic layer is disposed so as for a film plane to exist in almost perpendicular direction relative to the film plane. According to such a head structure, reproducing sensitivity decrease of the reproducing MR head due to noise or occurrence of recording fringe can be suppressed.

5 Claims, 15 Drawing Sheets

MAGNETIC HEAD WITH MAGNETO-RESISTANCE EFFECT ELEMENT DISPOSED ON OPPOSITE SIDE OF MAGNETIC CORE PAIR FROM RECORDING COIL

BACKGROUND OF THE INVENTION

1. Field of the Invention

The present invention relates to a magnetic head to be used in such as a magnetic disc unit, in particular, a magnetic head which uses a magneto-resistance effect head as a reproducing head.

2. Description of the Related Art

Accompanying recent high densification of magnetic recording density, a magnetic head utilizing magneto-resistance effect (referred to as MR element hereinafter) in which an electric resistance of a certain kind of magnetic thin film or a magnetic multi-layer film varies according to an external magnetic field is gathering attention as a reproducing head in a high recording density system. An MR head has a magneto-resistance effect element (MR element) in which an magneto-resistance effect film is used.

In a conventional magnetic disc unit, recording/reproducing operation is executed by levitating a magnetic head from a recording medium on a disc. Accompanying increase of a magnetic recording density, there is a tendency of lowering the levitation height of a magnetic head and a method of reading out information by gliding at a position more close to the medium is being tried.

However, when the recording density becomes 10 Gbpsi (Gbits/inch$^2$) or more, due to spacing loss through levitation of a magnetic head, it becomes difficult to get an enough S/N ratio of the magnetic head, or, due to contact between the magnetic head and the recording medium, possible damage be ignored. Therefore, such a recording/reproducing method as that, by devising a structure of a contact type magnetic head, actively makes contact with the recording medium is being tried.

In a magnetic head utilizing an MR element too, the contact method is expected as a technology capable of responding to high recording density. However, if an MR element is disposed directly on an air bearing surface, there is a risk of the MR element being worn out. If the MR element is worn out, width in a length (depth) direction varies creating fluctuation in head output, further there is a possibility that the MR film itself disappears. For this, use of a so-called yoke type MR head in which, to an MR element disposed inside a head, a signal magnetic field is led by a magnetic yoke consisting of a pair of magnetic cores disposed oppositely through a magnetic gap, is being investigated.

FIG. 23 is a perspective view showing an outline structure of a conventional yoke type MR head and a relative position relationship between the yoke type MR head and a recording medium. In the figure, numeral 1 shows a magnetic yoke consisting of a pair of magnetic cores. On the side of an air bearing surface of the magnetic yoke 1, a magnetic gap film 2 is interposed. An MR film 3 is disposed in such a manner that the MR film 3 is respectively magnetically coupled with a pair of magnetic cores constituting the magnetic yoke 1. Though not shown in the figure, the magnetic yoke 1 is insulated from the MR film 3. In the figure, numeral 4 is a pair of leads for supplying a sense current to the MR film 3.

The magnetic yoke 1 can be used as a magnetic pole of a recording head. Therefore, it is being investigated to form a recording coil 5, which supplies a recording magnetic flux to the magnetic yoke 1, on the rear portion of the magnetic yoke 1. Such a yoke type magnetic head can be used as a magnetic recording/reproducing separation type head.

In the yoke type MR head above described, the MR film 3 is an electromagnetic conversion portion and concurrently serves as a part of a magnetic circuit. In order to get a large output, it is required for magnetic resistance of the magnetic circuit as a whole to be reduced. In particular, the magnetic resistance is large at the MR film 3 and a neighboring area thereof. To transmit effectively a signal magnetic flux, which is led through the magnetic yoke 1, to the MR film 3, gap design between the magnetic yoke 1 and the MR film 3 becomes important. Primarily, to a degree an electric insulation can be secured, the yoke 1 and the MR film 3 are designed to be disposed as close as possible.

A yoke type MR head is expected as a head structure capable of responding to a contact recording/reproducing method. Further, it is expected as a head structure capable of easily responding to a magnetic recording/reproducing separation type head which concurrently uses a recording However, according to the investigation of the present inventors, as shown in FIG. 23, when the MR film 3 and the recording coil 5 are formed in the same plane, there is a concern that a magnetic field generated by an electric current flowing the recording coil 5 affects badly the MR film 3. This is considered to be a source of noise. Further, accompanying the high densification of the recording density, there is a risk of flowing in of a signal magnetic flux (shown in FIG. 23 with dotted lines) on the MR film 3 from a neighboring track T' as well as a recording track T to be traced. This is also considered to be a source of noise.

As shown in FIG. 24, there is also being discussed of a structure in which the magnetic yoke 1 is separated into a magnetic yoke 1A for a reproducing head and a magnetic yoke 1B for a recording head. In such a case, there is a concern of flowing in of a recording magnetic flux to a magnetic gap film 2A of the magnetic yoke 1A for a reproducing head from a magnetic gap film 2B of the magnetic yoke 1B for a recording head. This is also considered to be a source of noise. Besides, when a signal magnetic flux flows into a magnetic gap film 2B of a magnetic yoke 1B for a recording head from a magnetic gap film 2A of a magnetic yoke 1A for a reproducing head, there is a concern of recording fringe occurrence.

Thus, according to the investigation of the present inventors, in a magnetic head utilizing a magnetic yoke, there is a concern that a magnetic field, which occurs at the recording coil in the reproducing MR head, or a magnetic flux, which flows in from a neighboring track or the recording magnetic gap film, become sources of noise. Thereby, it is considered to cause a problem of inviting a deterioration of the reproducing sensitivity and the like. Besides, in a recording head, there is a concern that the magnetic flux flowing in from the reproducing magnetic gap film causes to occur the recording fringe.

SUMMARY OF THE INVENTION

Therefore, an objective of the present invention is to provide a magnetic head which enables to suppress decrease of reproducing sensitivity of a reproducing MR head due to noise occurrence and occurrence of recording fringe in a recording head, in particular, to provide a magnetic recording/reproducing separation type head which can suppress at the same time decrease of the reproducing sensitivity as well as the recording fringe.

A first magnetic head of the present invention comprises a pair of magnetic cores having an air bearing surface, a magnetic gap film interposed between the pair of magnetic cores on the side of the air bearing surface, at least one element selected from a magneto-resistance effect element in which a signal magnetic flux is led from a recording medium through a pair of magnetic cores and a recording coil which supplies a recording magnetic flux to the recording medium, and a ferromagnetic layer which is disposed on an extension of the film plane of the magnetic gap film and has a film plane having a perpendicular direction component with respect to the film plane of the magnetic gap film.

A second magnetic head of the present invention comprises at least pair of magnetic cores having an air bearing surface, a magnetic gap film interposed between the pair of magnetic cores on the side of the air bearing surface, a magneto-resistance effect element in which a signal magnetic flux is led from the recording medium through the pair of magnetic cores, wherein the magneto-resistance effect element is disposed along one main surface of the pair of magnetic cores, and a recording coil supplying a recording magnetic flux to a recording medium through the pair of magnetic cores, wherein a recording coil is disposed along the opposing other main surface of the pair of magnetic cores.

A third magnetic head of the present invention comprises a reproducing head including a pair of reproducing magnetic cores having an air bearing surface, a reproducing magnetic gap film interposed between the pair of reproducing magnetic cores on the side of the air bearing surface and a magneto-resistance effect element in which a signal magnetic flux is led from a recording medium through the pair of magnetic cores, and a recording head including a pair of recording magnetic cores having an air bearing surface, recording magnetic gap film interposed between the pair of recording magnetic cores on the side of the air bearing surface, wherein the recording magnetic gap film is formed at a position dislodged along a medium running direction from the reproducing magnetic gap film, and a recording coil supplying a recording magnetic flux to a recording medium through the recording magnetic cores.

In order to maintain reproducing head characteristics (reproducing characteristics) excellent in a reproducing head utilizing a magneto-resistance effect element, it is required to dispose a magnetic shield between a magneto-resistance effect element and a recording coil, a neighboring track, and a recording magnetic gap film, all of them being a noise source.

In the first magnetic head, at least on an extension of a film plane of a magnetic gap film, a ferromagnetic layer comprising a film plane having a perpendicular direction component with respect to the film plane is disposed. This ferromagnetic layer functions as a magnetic shield against a recording coil, a neighboring track, a recording magnetic gap film and the like, all of them being a noise source. According to such a head structure, flowing in of an unnecessary magnetic flux to a magneto-resistance effect element from a recording coil, a neighboring track and a recording magnetic gap film can be suppressed. Therefore, by suppressing the occurrence of noise, reproducing property excellent in linearity can be made possible.

Besides, the above described ferromagnetic layer can be made to function as a magnetic shield against a reproducing magnetic gap film or a neighboring track for the sake of a recording head. In this case, occurrence of recording fringe can be made to be suppressed.

In the second magnetic head, a magneto-resistance effect element and a recording coil are respectively disposed along both opposing main surfaces of a pair of magnetic cores. In such a head structure, since a magnetic core functions as a magnetic shield, the magnetic field generated at a recording coil is suppressed from badly affecting a magneto-resistance effect element. Thereby, by suppressing the occurrence of noise, a reproducing property excellent in its linearity can be made to obtain. Here, when a magnetic core has a reproducing magnetic core and a recording magnetic core, the other magnetic core functions as a ferromagnetic layer (magnetic shield) of the first invention.

In the third magnetic head, when a reproducing magnetic core and a recording magnetic core are used in conjunction, a reproducing magnetic gap film and a recording magnetic gap film are formed at positions dislodged along a medium running direction. Thereby, for the sake of a reproducing magnetic gap film, flowing in of a magnetic field from a recording magnetic gap film can be suppressed. In addition, for the sake of a recording magnetic gap film, flowing in of a magnetic field from a reproducing magnetic gap film can be suppressed. Therefore, as to a reproducing head in which a magneto-resistance effect element is used, by suppressing noise occurrence, a reproducing characteristics excellent in its linearity can be obtained. Besides, as to a recording head, it is possible to suppress the occurrence of recording fringe.

DESCRIPTION OF THE PREFERRED EMBODIMENTS

In the following, embodiments for implementing the present invention will be described with reference to drawings.

Figure 1:
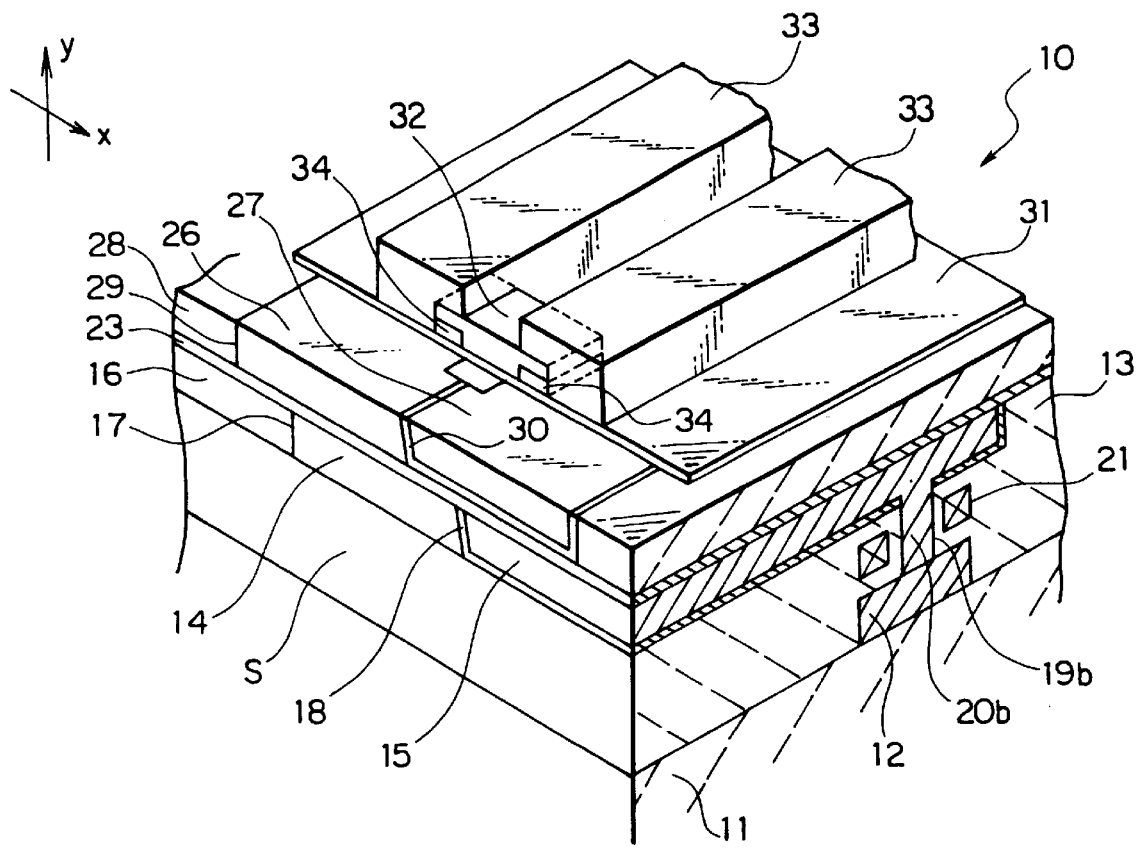
FIG. 1 is a perspective view showing an outline structure of a first embodiment in which a magnetic head of the present invention is employed in a magnetic recording/reproducing separation type head with a partial cross-section.
Figure 2:
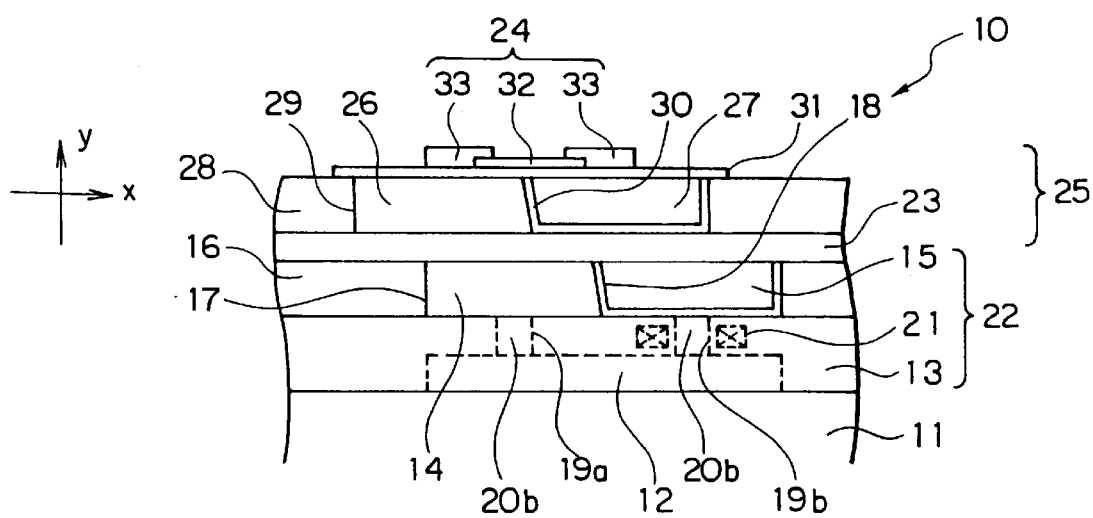
FIG. 2 is a front view of a magnetic recording/reproducing separation type head shown in FIG. 1.

FIG. 1 and FIG. 2 are diagrams showing an outline structure of a first embodiment of a magnetic recording/reproducing separation type head in which a magnetic head of the present invention is employed. FIG. 1 is a perspective view showing a magnetic recording/reproducing separation type head with a partial cross-section, and FIG. 12 is a front view thereof seen from the side of an air bearing surface.

In a magnetic recording/reproducing separation type head 10 shown in these figures, on one main surface of a substrate 11 consisting of an $Al_2O_3$/TiC substrate (Altic substrate) having an $Al_2O_3$ insulation film and the like, a back-yoke 12 of a recording magnetic yoke is formed on the rear side (shown with dotted line in FIG. 2) seen from an air bearing surface S. A back-yoke 12 is formed of a soft magnetic material such as FeN, an NiFe alloy, or a CoZrNb amorphous alloy.

On a back-yoke 12, through an insulation layer 13 formed of such as $SiO_2$, a pair of magnetic cores constituting a recording magnetic yoke body are formed. Here, a magnetic core on one side is called a first recording magnetic yoke 14, a magnetic core on the other side is called a second recording magnetic yoke 15. The first and the second recording magnetic yoke, 14,15 are formed of a soft magnetic material identical as that of a back-yoke 12.

The first and the second recording magnetic yoke 14, 15 are formed by embedding inside a magnetic yoke formation portion 17 disposed on an insulation layer 16 consisting of such as $SiO_2$. Each main surface of these constitutes the same plane nearly in parallel with main surface (substrate surface) of a substrate 11. In other words, the first and the second recording magnetic yokes 14, 15 are disposed so as to form the same plane nearly in parallel with a medium running direction (x direction). Thicknesses of the recording magnetic yokes 14,15 correspond to the recording track width. These thicknesses are designed according to a desired track width.

On an air bearing surface S side, between a first recording magnetic yoke 14 and a second recording magnetic yoke 15, a recording magnetic gap film 18 is interposed. A recording magnetic gap film 18 is formed in such a manner that it has a perpendicular direction component with respect to main surface of a substrate 11. A recording magnetic gap film 13 is made of a non-magnetic material such as $Al_2O_3$ or $SiO_2$ of a predetermined thickness. The first and the second recording magnetic yokes 14, 15 form a pair of magnetic poles.

The first and the second recording magnetic yokes 14, 15 and a back-yoke 12 are magnetically coupled with soft magnetic material layers 20a, 20b embedded inside two through-holes 19a, 19b disposed on a $SiO_2$ insulation layer 13. Thereby, a magnetic circuit as a recording magnetic yoke (recording magnetic pole) is formed. Further, a recording coil 21 is disposed in such a manner that it winds a soft magnetic material layer 20b embedded inside one through-hole 19b. Thereby, a recording head 22 is formed.

In a recording head 22, a recording magnetic flux generated by energizing a recording coil 21 passes through the first and the second recording magnetic yokes 14, 15 magnetically coupled by a back-yoke 12 and the soft magnetic material layers 20a, 20b to be supplied to a recording medium from a magnetic gap film 18 as a leakage flux. Thus, the signal is recorded on the recording medium.

On a recording magnetic head 22, through an insulation film 23 consisting of such as $Al_2O_3$, a reproducing head 25 which has an MR element (magneto-resistance effect element) 24 is formed thereon. A reproducing head 25 has a reproducing magnetic yoke formed of a pair of magnetic cores. Here, one magnetic core is called a first reproducing magnetic yoke 26, the other magnetic core is called a second reproducing magnetic yoke 27. These reproducing magnetic yokes, 26, 27 work as a magnetic circuit which leads a signal magnetic flux from a recording medium to an MR element 24.

The first and the second reproducing magnetic yokes 26, 27 are formed, as identical as the recording magnetic yokes 14,15, by embedding inside a magnetic yoke forming concave portion 29 disposed on an insulation layer 28 formed of such as $SiO_2$. Each main surface of these constitutes the same plane nearly in parallel with a main surface of the recording magnetic yokes 14, 15. The reproducing magnetic yokes 26, 27 are made of a soft magnetic material such as FeN, an NiFe alloy, or a CoZrNb amorphous alloy. Thicknesses of the reproducing magnetic yokes 26, 27 correspond to a reproducing track width. These thicknesses are designed according to a predetermined reproducing track width.

On an air bearing surface S side, between the first reproducing magnetic yoke 26 and the second reproducing magnetic yoke 27, a reproducing magnetic gap film 30 is interposed. A reproducing magnetic gap film 30 has a perpendicular direction component with respect to the main surface of a substrate 11 and is consisted of a non-magnetic film such as $Al_2O_3$ film of a predetermined thickness.

Here, a reproducing magnetic gap film 30 is formed at a position dislodged along a medium running direction (x-direction in the figure) from a position of a recording magnetic gap film 18. In other words, a recording magnetic gap film 18 and a reproducing magnetic gap film 30 are formed with an appropriate spacing with respect to a medium running direction (x-direction). A recording magnetic gap film 18 formed at a dislodged position and a reproducing magnetic gap film 30 suppress mingling of magnetic flux. That is, for a recording magnetic gap film 18, a magnetic flux is suppressed from flowing in from a reproducing magnetic gap film 30. For a reproducing magnetic gap film 30, a magnetic flux is suppressed from flowing in from a recording magnetic gap film 18.

A configuration in which a recording magnetic gap film 18 and a reproducing magnetic gap film 30 are disposed by dislodging along a medium running direction can be materialized by disposing in parallel the recording magnetic yokes 14, 15 and the reproducing magnetic yokes 26, 27 on a substrate 11. However, in this case, it is required for a substrate 11 to be made large, thus, weight of the magnetic head increases. In a contact type magnetic recording/reproducing head, it is particularly required to reduce the weight of the head. From these circumstances, the recording magnetic yokes 14, 15 and the reproducing magnetic yokes 26, 27 are preferred to be formed by stacking on the substrate 11.

On the first and the second reproducing magnetic yokes 26, 27, through an insulation film 31 made of such as SOG (Spin On Glass) and the like, an MR film (magneto-resistance effect film) 32 is formed. Both edge portions of a longer direction of the MR film 32, through an SOG insulation film 31, are magnetically coupled respectively with the first and the second reproducing magnetic yokes 26, 27. The SOG insulation film 31 contributes in improving smoothness of bed layer surface. Thereby, characteristics of the MR film 32 can be improved. The MR film 32 is formed at a position receded a predetermined distance from the air bearing surface S in such a manner that its longer direction is nearly in parallel with the air bearing surface S.

On the upper side of both edge portions of the longer direction of the MR film 32, a pair of leads 33 supplying a sense current to the longer direction of the MR film 32 is formed. A pair of leads 33 is made of such as Cu. In addition, on the lower side of both edge portions of the longer direction of the MR film 32, bias magnetic field inputting films 34 which input a bias magnetic field to the MR film 32 are respectively disposed. The bias film 34 is made of such as a CoPt alloy film. The bias film 34, without restricting to a hard magnetic film, can be constituted of an anti-ferromagnetic film such as an IrMn alloy film. Further, in FIG. 2, the bias magnetic field inputting film is omitted. The MR element 24 is constituted by the MR film 32, a pair of leads 33 and a pair of bias magnetic field inputting films 34.

As described above, the recording coil 21 is formed along a lower side main surface of the recording magnetic yokes 14, 15. Besides, the MR element 24 is formed along an upper side main surface of the reproducing magnetic yokes 26, 27. And, the reproducing magnetic yokes 26, 27 are stacked on the recording magnetic yokes 14, 15 through an $Al_2O_3$ insulation film 23. Thus, between the recording coil 21 and the MR element 24, the recording magnetic yokes 14, 15 and the reproducing magnetic yokes 26, 27 are interposed. In other words, the recording coil 21 is formed along one main surface (the lower side main surface) of a stacked body (stacked magnetic yoke) formed between the recording magnetic yokes 14, 15 and the reproducing magnetic yokes 26, 27, and the MR element 24 is formed along an opposing reverse side main surface (the upper side main surface).

A disposing position of the MR element 24 along its length direction is preferred to be relatively close to the air bearing surface S after taking account of short or abrasion due to contact with the recording medium. The shape of the MR film 32 or leads 33 is not restricted to the one shown in FIG. 1 and FIG. 2. Various shapes can be employed such as that, for example, the longer side of the MR film is formed almost to be orthogonal to the air bearing surface and, at the same time, a lead for supplying a sense current to the longer direction of the MR element is formed.

As an MR film 32, such as an anisotropic magneto-resistance effect film (AMR film) consisting of such as $Ni_{80}Fe_{20}$ which electric resistance varies depending on an angle formed between the direction of an electric current and magnetic moment of the magnetic layer, a spin valve film made of, for example, a laminate film of $Co_{90}Fe_{10}/Cu/Co_{90}Fe_{10}$ structure which shows a so-called spin valve effect wherein the ferromagnetic layers and the non-magnetic layer exist in a stacked structure and the electric resistance varies depending an angle between each ferromagnetic layer's magnetization, an artificial lattice film which shows a giant magneto-resistance effect, a ferromagnetic tunneling junction element (Tunneling MR:TMR), or a magnet-impedance element can be cited.

In the above described reproducing head 25, a signal magnetic flux, which flew into the first and second reproducing magnetic yokes 26, 27 from the recording medium through the reproducing magnetic gap film 30, is led to the MR film 32. Thus, by flowing the signal magnetic flux to the MR element 32, the signal magnetic field can be reproduced.

In a magnetic recording/reproducing separation type head 10 of this embodiment, the recording coil 21 and the MR element 24 are formed respectively along opposing each main surface of a stacked body (stacked magnetic core) formed by stacking the recording magnetic yokes 14, 15 and the reproducing magnetic yokes 26, 27. Between the recording coil 21 and the MR element 24, the recording magnetic yokes 14, 15 and the reproducing magnetic yokes 26, 27 are interposed. The recording magnetic yokes 14, 15 and the reproducing magnetic yokes 26, 27 work as a magnetic shield against the recording coil 21 or the neighboring track both of which are noise sources for the MR element 24. Therefore, an unnecessary magnetic field is prevented from flowing into the MR element 24 to suppress adverse effects.

Further, the recording magnetic gap film 18 and the reproducing magnetic gap film 30 are formed at positions dislodged with respect to the medium running direction. Therefore, unnecessary flowing in of the magnetic field from the recording magnetic gap film 18 to the reproducing magnetic gap film 30 can be suppressed. That is, cross-talk due to leakage of the recording magnetic field to the reproducing magnetic gap film 30 can be reduced. Thereby, at the reproducing head 25, noise occurrence can be suppressed. According to such a reproducing magnetic head 25, reproducing characteristics excellent in its linearity can be obtained.

In the recording head 22, the unnecessary magnetic field is suppressed from flowing in from the reproducing magnetic gap film 30 or the neighboring track to the recording magnetic gap film 18. Thereby, recording fringe can be suppressed from occurring.

The magnetic recording/reproducing separation type head 10 of the above described embodiment can be manufactured, for example, in the following manner. In the following, a manufacturing method of the magnetic recording/reproducing separation type head 10 will be described with reference to FIG. 3A through FIG. 8.

Figure 3A:
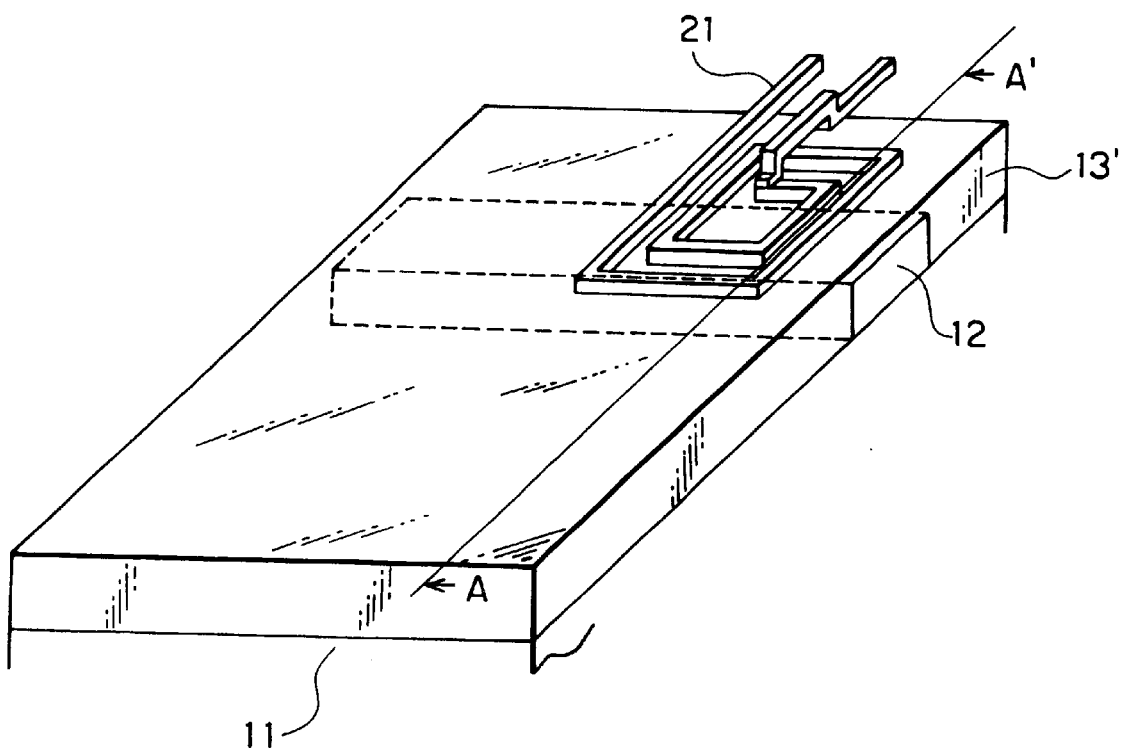
FIG. 3A and FIG. 3B are the first process drawings showing one example of a manufacturing process of a magnetic recording/reproducing separation type head shown in FIG. 1.
Figure 3B:
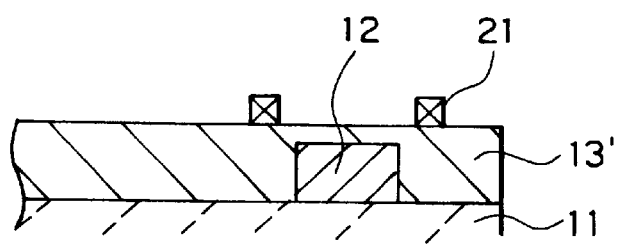

First of all, a substrate 11 formed by coating an $Al_2O_3$ insulation film on main surface of an $Al_2O_3$/Ti substrate and by smoothing its surface is prepared. On the substrate 11, as shown in FIG. 3A and FIG. 3B, a CoZrNb amorphous alloy film of a thickness of about 2 μm is formed by, for example, a sputtering method. By patterning this with ion-milling method, a back-yoke 12 is formed.

Next, after embedding the whole body by forming $SiO_2$ layer 13' into a film of 3 μm, resist is coated and the ion-milling is executed with an angle of about 50 degree. So as to Keep the $SiO_2$ layer 13' of a thickness of about 0.5 μm on the back-yoke 12, the $SiO_2$ layer 13' is etch-backed to be smoothed. On the $SiO_2$ layer 13', the recording coil 21 consisting of such as Cu is formed with a flame plating method.

Figure 4A:
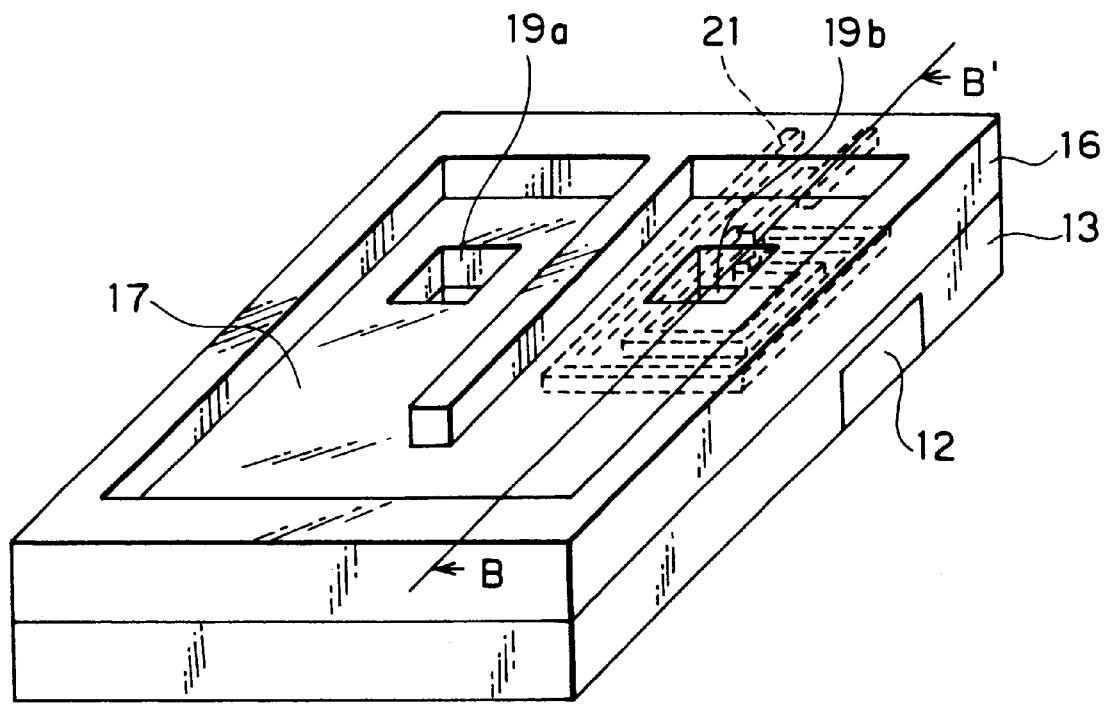
FIG. 4A and FIG. 4B are the second process drawings following FIG. 3A and FIG. 3B of a manufacturing process of a magnetic recording/reproducing separation type head.
Figure 4B:
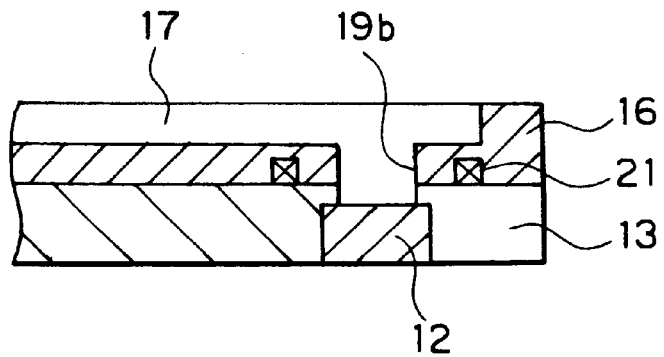

Then, as shown in FIG. 4A and FIG. 4B, including the recording coil 21, a $Sio_2$ insulation film 16 of a thickness of about 3.5 μm is further formed in film with a bias sputtering method. On this $SiO_2$ insulation film 16, magnetic path holes (through-hole) 19a, 19b through which magnetic flux runs are formed by RIE (Reactive Ion Etching) method employing $CF_4$ gas to expose the surface of the back-yoke 12. Further, conforming to the shape of the recording magnetic yoke, that is, the shape obtained by combining the first and the second recording magnetic yokes 14, 15, up to the depth of about 0.7 μm, $SiO_2$ insulation film 16 is etched with the RIE method. The magnetic yoke forming concave portion 17 is formed by this etching.

Figure 5:
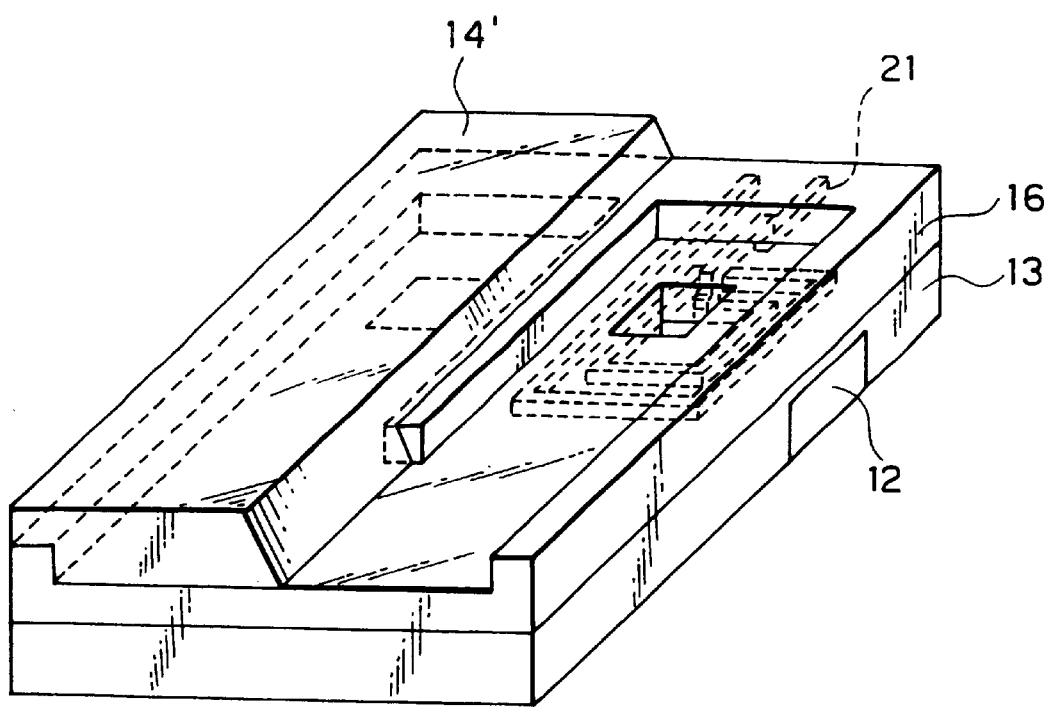
FIG. 5 is a third process drawing following FIG. 4A and FIG. 4B of a manufacturing process of a magnetic recording/reproducing separation type head.

Then, as shown in FIG. 5, inside the magnetic yoke forming concave portion 17, an Fe based high saturation magnetization film 14' which becomes recording magnetic yoke material is formed in film of a thickness of 0.7 μm. This is partly etched to form a shape of almost the recording magnetic yoke shape. Etching operation is executed by the RIE method employing chlorine based gas or the ion-milling method.

Figure 6:
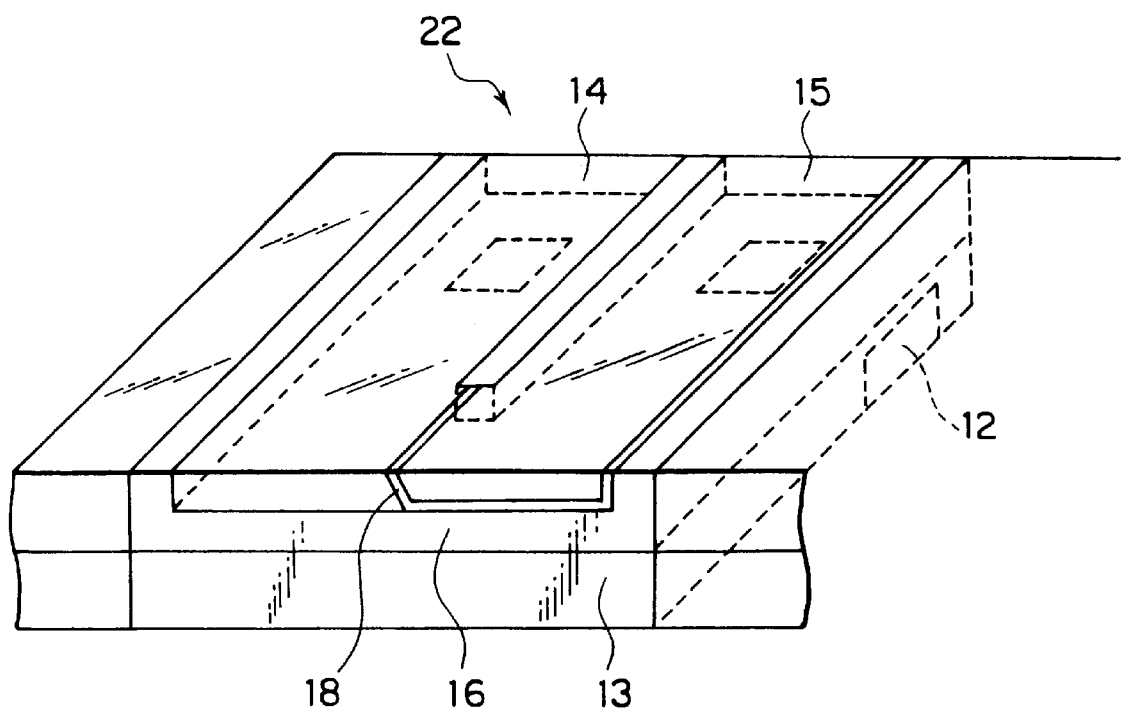
FIG. 6 is a fourth process drawing following FIG. 5 of a manufacturing process of a magnetic recording/reproducing separation type head.

Then, a $SiO_2$ film of a thickness of about 130 nm destined to be the recording magnetic gap film 18 and an Fe based high saturation magnetization film of a thickness of about 0.7 μm destined to be the second recording magnetic yoke 15 are formed into film in turn. By smoothing up to 0.5 μm of the yoke thickness with, for example, a CMP (Chemi-Mechanical Polishing) method, as shown in FIG. 6, the recording magnetic yokes 14, 15 interposed therebetween the recording magnetic gap film 18 on the air bearing surface side are formed. With the above described process, the recording head 22 is brought almost to completion.

On the above described recording head 22, an $Al_2O_3$ insulation film 23 of a thickness of about 0.2 μm and a $SiO_2$ insulation layer 28 of a thickness of about 0.7 μm are formed in film in turn. The $SiO_2$ insulation layer 28 is etched with the RIE method in the identical manner with the forming process of the recording head portion 22. The $SiO_2$ insulation layer 28 is etched up to a depth of about 0.7 μm corresponding to a shape conforming the shape of the reproducing magnetic yoke, that is to say, a shape meeting the first and the second reproducing magnetic yokes 26, 27 combined. The magnetic yoke forming concave portion 29 is formed by etching.

Then, a CoZrNb amorphous alloy film destined to be the reproducing magnetic yoke material is formed into a film of about 0.7 μm thickness, which is partly etched so as to remain corresponding to the shape of the first reproducing magnetic yoke 26, The etching operation is executed by the RIE method with chlorine based gas or with the ion-milling method. A $SiO_2$ film of a thickness of 100 nm destined to be the reproducing magnetic gap film 30 and a CoZrNb amorphous alloy film of a thickness of 0.7 μm destined to be the second reproducing magnetic yoke are formed into film in turn. Until the thickness of the yoke becomes 0.5 μm, the yoke is smoothed with, for example, the CMP method.

Figure 7:
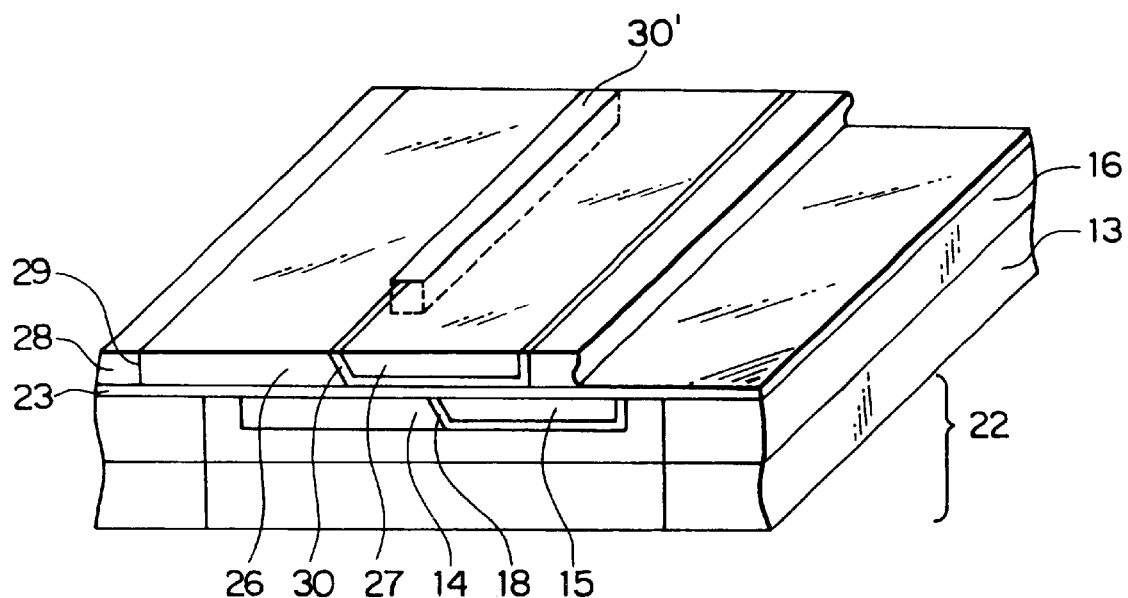
FIG. 7 is a fifth process drawing following FIG. 6 of a manufacturing process of a magnetic recording/reproducing separation type head.

With the above described etch-back, as shown in FIG. 7, the reproducing magnetic yokes 26, 27 interposed therebetween the producing magnetic gap film 30 on the air bearing surface S side are formed, thereby the yoke of the reproducing head portion 25 is brought almost to completion. Here, a position where the reproducing magnetic gap film 30 is formed is separated, for example, about 20 μm from the recording magnetic gap film 18 to the medium running direction. On the rear side of the reproducing magnetic gap film 30, a reproducing back-gap 30' of a width of 2 μm continued therewith is formed.

Figure 8:
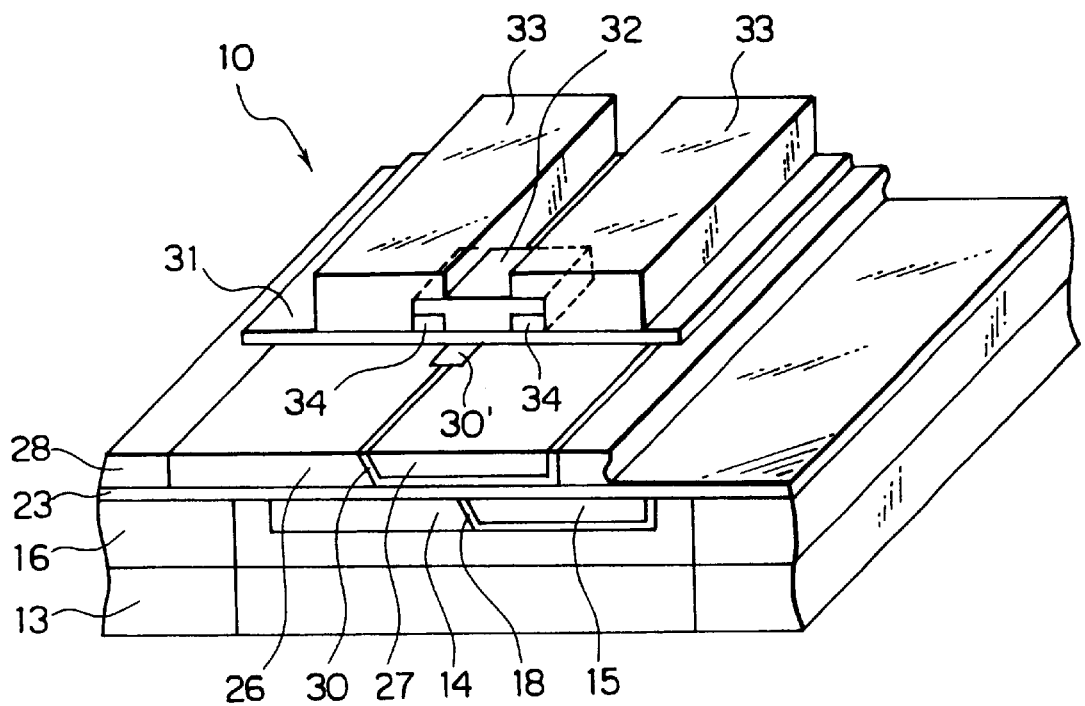
FIG. 8 is a sixth process drawing following FIG. 7 of a manufacturing process of a magnetic recording/reproducing separation type head.

Then, as shown in FIG. 8, by coating water glass (SOG) of about 100 μm thickness, formation of the SOG insulation film 31 and smoothing of the surface of the substrate of the MR film are implemented. The thickness of the SOG insulation film 31 is made to be 1 μm or less. Through the SOG insulation film 31, on the reproducing back-gap 30', the MR element 24 having a spin valve film is formed.

First of all, on the SOG insulation film 31, a laminate film of Cr (5 nm)/CoPt (20 nm) is formed. By patterning it on both sides of the back-gap 30', a pair of ferromagnetic bias films 34 are formed. Next, as the MR film 32, a spin valve film having a stacked structure of, for example, CoZrNb (10 nm)/NiFe (3 nm)/CoFe (2 nm)/Cu (3 nm)/CoFe (2 nm)/IrMn (10 nm)/Ti (15 nm) is formed, which is then patterned in a stripe shape.

After this, as a lead film, a laminate film of Ta (10 nm)/Cu (80 nm)/Ta (10 nm) structure is formed into film, and, by patterning which into a predetermined lead shape, a pair of leads 33 are obtained. Further, leader lines of the recording coil 21 and the reproducing lead 33 are formed by copper plating. With the above described processes, the process for forming the magnetic recording/reproducing separation type head 10 is completed.

In a head structure where the recording magnetic yokes 14, 15 and the reproducing magnetic yokes 26, 27 are respectively formed in an independent manner, a high saturation magnetization material such as FeN or NiFe alloy can be employed for the recording magnetic yokes 14, 15 and a low coercive force material such as a CoZrNb amorphous alloy can be employed for the reproducing magnetic yokes 26, 27. Thereby, coexistence of excellent recording characteristics and the excellent reproducing characteristics can be made possible.

Figure 9:
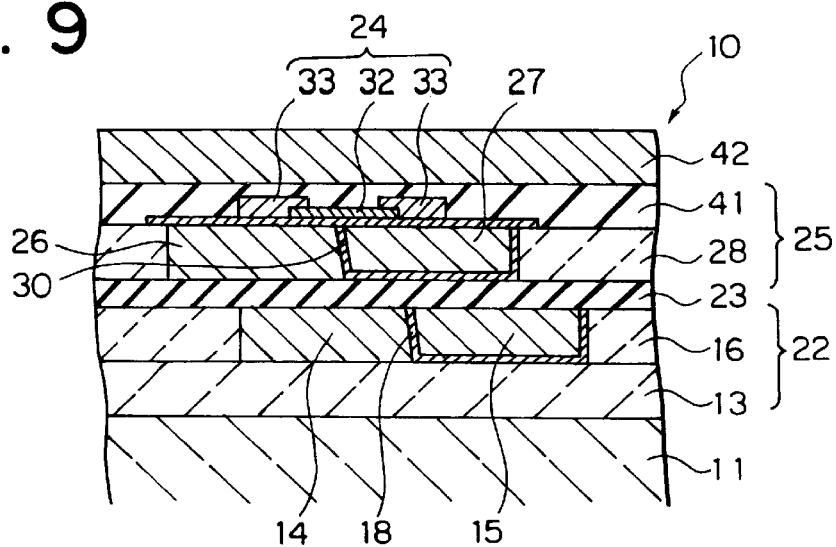
FIG. 9 is a sectional view showing a first modification example of a magnetic recording/reproducing separation type head shown in FIG. 1.

In the magnetic recording/reproducing separation type head 10 described above, as shown in FIG. 9, on the MR element 24 through the insulation film 41, a soft magnetic layer 42 such as a CoZrNb amorphous alloy film can be further formed. The soft magnetic layer 42 is formed to be parallel with the reproducing magnetic yokes 26, 27. The soft magnetic layer 42 suppresses the influence of cross-talk in which signal from the adjoining track comes in directly to the MR element 24 and the reproducing magnetic gap film 30.

Thus, the soft magnetic layer (ferromagnetic layer showing soft magnetic characteristics) 42 which, on the extension of the film plane of the reproducing magnetic gap film 30, is disposed in such a manner that a film plane having a perpendicular direction component with respect to the magnetic gap film 30 exists works as a magnetic shield layer of the MR element 24. Thereby, noise occurrence due to flowing in of the magnetic flux from the adjacent track can be suppressed. According to such a head structure, reproducing characteristics excellent in its linearity can be obtained.

Figure 10:
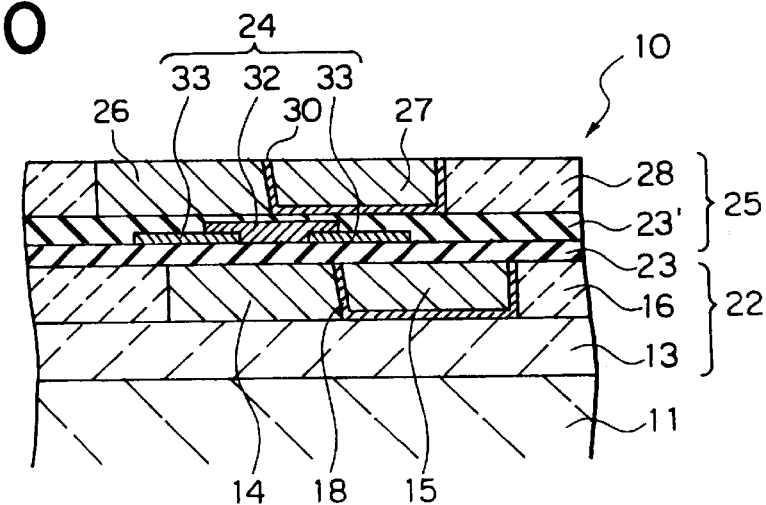
FIG. 10 is a sectional view showing a second modification example of a magnetic recording/reproducing separation type head shown in FIG. 1.

Further, as shown in FIG. 10, preceding formation of the reproducing magnetic yokes 26, 27, the MR element 24 may be formed on the $Al_2O_3$ insulation film 23 in advance. In this case, the MR element 24 is disposed between the recording magnetic yokes 14, 15 and the reproducing magnetic yokes 26, 27. In the above described manufacturing process, after the $Al_2O_3$ insulation film 23 is formed into film on the recording head 22, the MR element 24 is formed. After covering on the MR element 24 with the insulation film 23', the reproducing magnetic yokes 26, 27 are formed.

By forming in such a head structure, the reproducing magnetic yokes 26, 27 also play the role of a magnetic shield of the MR element 24. In the MR element 24 interposed between the recording magnetic yokes 14, 15 and the reproducing magnetic yokes 26, 27, influence of cross-talk directly entering the signal from the adjacent track can be suppressed.

Figure 11:
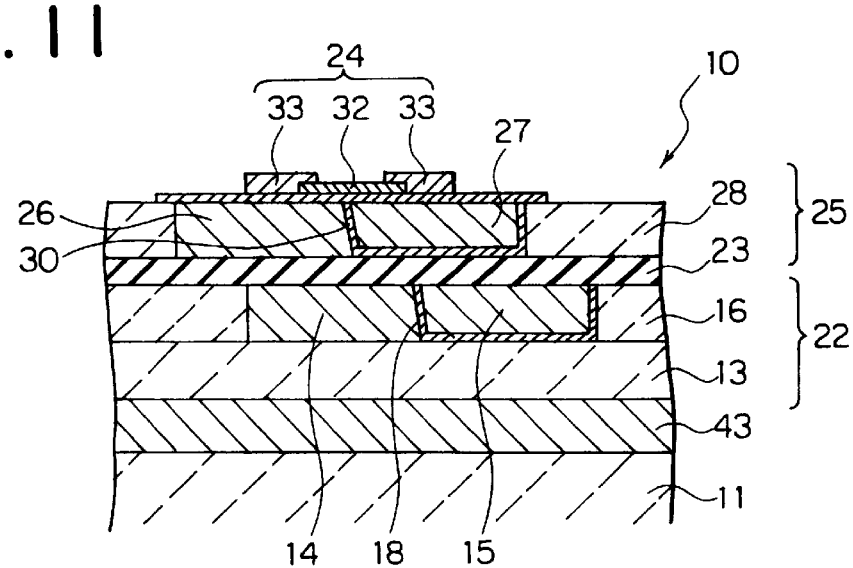
FIG. 11 is a sectional view showing a third modification example of a magnetic recording/reproducing separation type head shown in FIG. 1.

As shown in FIG. 11, in the recording magnetic head 22, prior to formation of the recording magnetic yokes 14, 15, on the substrate 11, a soft magnetic layer 43 such as a CoZrNb amorphous alloy film can be formed. The recording magnetic yokes 14, 15 are interposed by the soft magnetic layer 43 and the reproducing magnetic yokes 26, 27. According to such a structure, shield effect can be obtained during recording and recording fringe can be reduced.

Thus, the soft magnetic layer 43 and the reproducing magnetic yokes 26, 27 (soft magnetic layer) disposed in such a manner that a film plane having a perpendicular direction component with respect to the magnetic gap film 18 exists on the extension of the film plane of the recording magnetic gap film 18 work as a magnetic shield layer against the recording magnetic gap film 18. Therefore, recording fringe can be reduced.

The soft magnetic layer serving as the above described magnetic shield layer shows a more excellent effect by disposing respectively on both of the upper and lower surfaces of the recording magnetic yokes 14, 15 and the reproducing magnetic yokes 26, 27. The manufacturing process of the magnetic recording/reproducing separation type head 10 having such a structure will be described with reference to FIG. 12A through FIG. 12D.

Figure 12A:
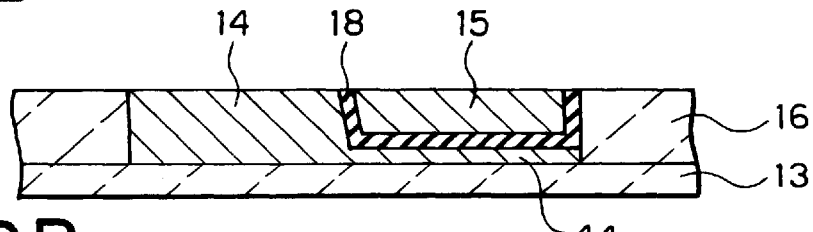
FIG. 12A, FIG. 12B, FIG. 12C and FIG. 12D are sectional views showing an outline structure of a fourth modification example of a magnetic recording/reproducing separation type head shown in FIG. 1 and a manufacturing process thereof.

Firstly, as shown in FIG. 12A, the soft magnetic layer destined to be the first recording magnetic yoke 14 is etched for a part of which to remain below the recording magnetic gap film 18 and the second recording magnetic yoke 15. The remaining portion of the soft magnetic film becomes the lower side magnetic shield layer 44 of the recording magnetic yokes 14, 15.

Figure 12B:
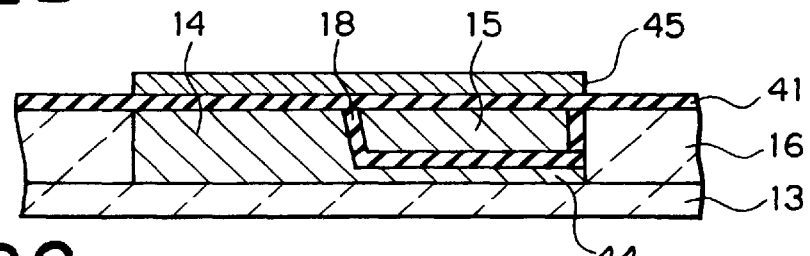
Figure 12C:
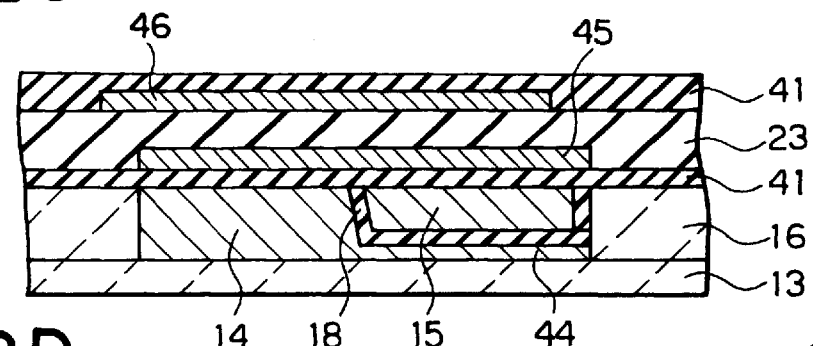

As shown in FIG. 12B, on the recording magnetic yokes 14, 15, a soft magnetic layer destined to be an upper side magnetic shield layer 45 is formed through an $Al_2O_3$ insulation film 41. Then, as shown in FIG. 12C, after an $Al_2O_3$ insulation film 23 is formed in film on the upper side magnetic shield layer 45, a soft magnetic layer destined to be the lower side magnetic shield layer 46 of the reproducing magnetic yoke is formed. The soft magnetic layer is covered by such as an $Al_2O_3$ insulation film 41.

Figure 12D:
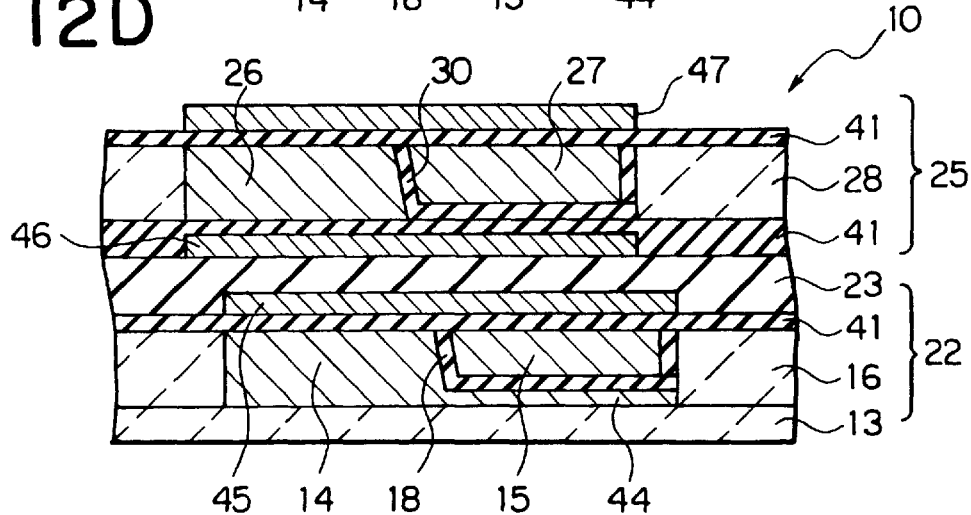

Thereafter, as shown in FIG. 12D, according to the above described manufacturing process, the reproducing magnetic yokes 26, 27, the reproducing magnetic gap film 30, and the MR element (omitted in FIGS. 12A, 12B, 12C and 12D) are formed. Further, on the MR element through the $Al_2O_3$ insulation film 41, a soft magnetic layer destined to be the upper side magnetic shield layer 47 of the reproducing magnetic yoke is formed.

In the above described head structure, the recording magnetic yoke 14, 15 are interposed between the lower side and the upper side magnetic shield layers 44, 45. In addition, the reproducing magnetic yokes 26, 27 are interposed between the lower side and the upper side magnetic shield layers 46, 47. In the reproducing magnetic head 25, flowing in of unnecessary magnetic flux from the recording coil, the adjacent track, the recording magnetic gap film and the like can be suppressed. Thereby suppressing noise occurrence, reproducing characteristics excellent in its linearity can be obtained. In the recording head 22, unnecessary magnetic flux can be suppressed from flowing in from the reproducing magnetic gap film and the like. Thereby, recording fringe occurrence can be suppressed.

Figure 13:
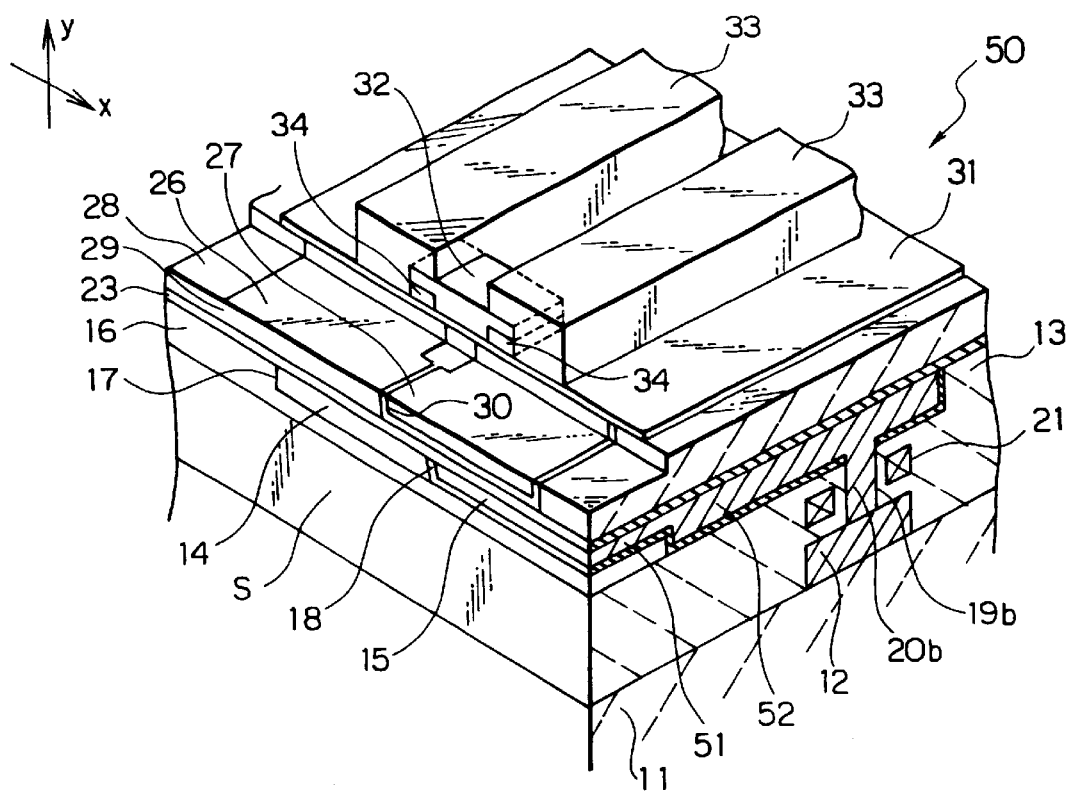
FIG. 13 is a perspective view showing an outline structure of a second embodiment in which a magnetic head of the present invention is employed in a magnetic recording/reproducing separation type head with a partial cross-section.
Figure 14:
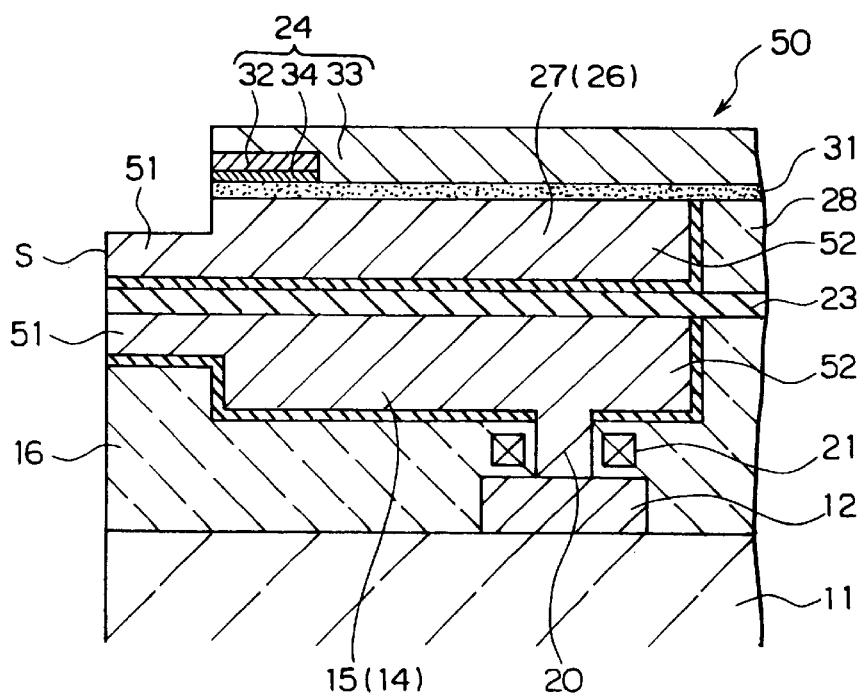
FIG. 14 is a sectional view of a magnetic recording/reproducing separation type head shown in FIG. 13.

Next, a magnetic recording/reproducing separation type head according to the second embodiment in which a magnetic head of the present invention is applied will be described with reference FIG. 13 through FIG. 14. FIG. 13 and FIG. 14 are diagrams showing outline structures of a magnetic recording/reproducing separation type head 50 of the embodiment. FIG. 13 is a perspective view showing a magnetic recording/reproducing separation type head with a cross-section of a part, FIG. 14 is a sectional view thereof cut in the track width direction.

A principal structure of a magnetic recording/reproducing separation type head 50 shown in these figures is rendered identical with the above described first embodiment. In addition, in FIG. 13 and FIG. 14, the identical portion with the first embodiment is given an identical numeral. The difference from the first embodiment is that the recording magnetic yokes 14, 15 and the reproducing magnetic yokes 26, 27, respectively, have a yoke tip portion 51 having a thickness corresponding to the recording/reproducing track and a yoke body 52 thicker than the yoke tip portion 5.

The yoke tip portion 51 are respectively disposed on the air bearing surface S side. The yoke tip portions 51 constitute the air bearing surface S and a neighboring portion of the recording magnetic yokes 14, 15 and the reproducing magnetic yokes 26, 27. The yoke bodies 52 continue from the yoke tip portions 51 to be disposed inside the head.

As shown in the first embodiment, when the recording magnetic yokes 14, 15 and the reproducing magnetic yokes 26, 26 are formed with thicknesses corresponding to the recording track width and the reproducing track width, it is required the thickness of the yoke (magnetic cores) as a whole to be, for example, about 0.5 $\mu$m. In such a magnetic core, magnetic resistance becomes large and there is a concern that the magnetic flux can not be effectively transmitted. As the result, the volume of the magnetic flux transmitted from the recording medium to the MR element attenuates. Besides, the magnetic flux generated at the recording coil 21 also attenuates.

As to such a point, by constituting only the yoke tip portions 51 of the air bearing surface S side with a magnetic core of the recording/reproducing track width and by constituting the yoke bodies 52 inside the head with a magnetic core having an enough thickness, the magnetic resistance of the recording magnetic yokes 14, 15 and the reproducing magnetic yokes 26, 27 can be diminished. Therefore, in the reproducing head 25, the magnetic flux can be effectively transmitted from the recording medium to the MR element 24, excellent reproducing output is made possible to obtain. Besides, in the recording head 22, the magnetic flux generated at the recording coil 21 can be effectively transmitted and the excellent recording characteristics corresponding to high density recording can be obtained.

A magnetic recording/reproducing separation type head 50 of the above described embodiment can be manufactured by, for example, the following manner. In the following, with reference to FIG. 15 through FIG. 18, a manufacturing process of a magnetic recording/reproducing separation type head 50 will be described.

At first, as identical as the process shown in FIG. 3A, FIG. 3B, FIG. 4A and FIG. 4B, on an $Al_2O_3$/TiC substrate 11 with $Al_2O_3$ insulation film, a back-yoke 12, a recording coil 21 and $SiO_2$ layers 13, 16 are formed in turn, further, the $SiO_2$ insulation layer 16 is provided with through holes 19.

Figure 15:
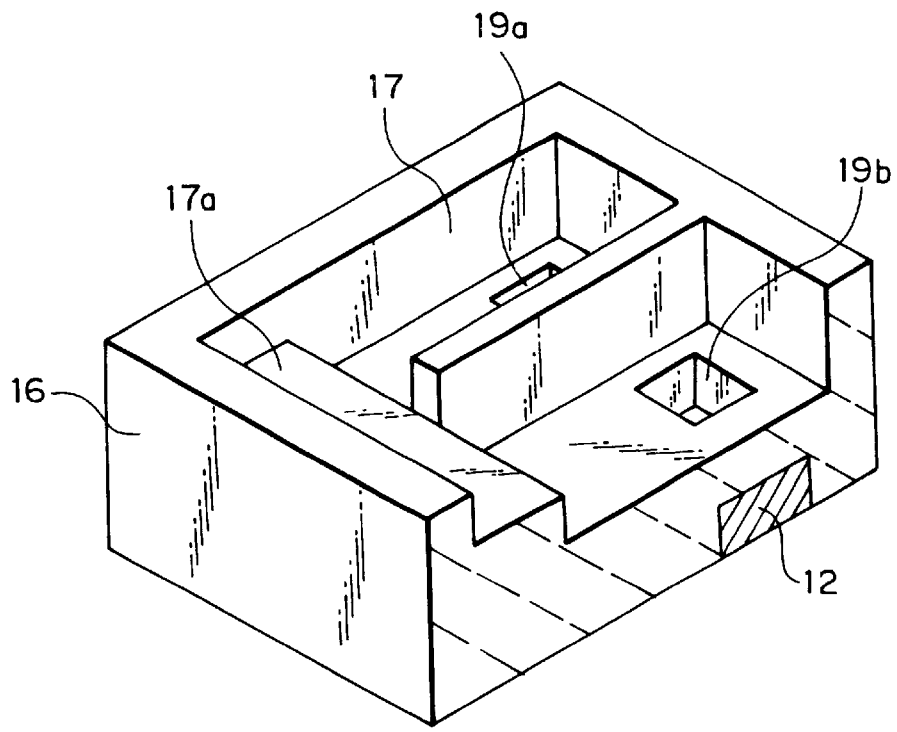
FIG. 15 is a first process drawing showing one example of a manufacturing process of a magnetic recording/reproducing separation type head shown in FIG. 13.

Then, as shown in FIG. 15, conforming a combined shape of the first and the second recording magnetic yokes 14, 15, the $SiO_2$ insulation layer 16 is etched to form a yoke forming concave portion 17. Here, the air bearing surface side of the yoke forming concave portion 17 is made shallow corresponding to the thickness of the yoke tip portion 51 to form a portion 17a mounded step-like. In other words, the inside side of the head is etched deep according to the yoke body 52.

Figure 16:
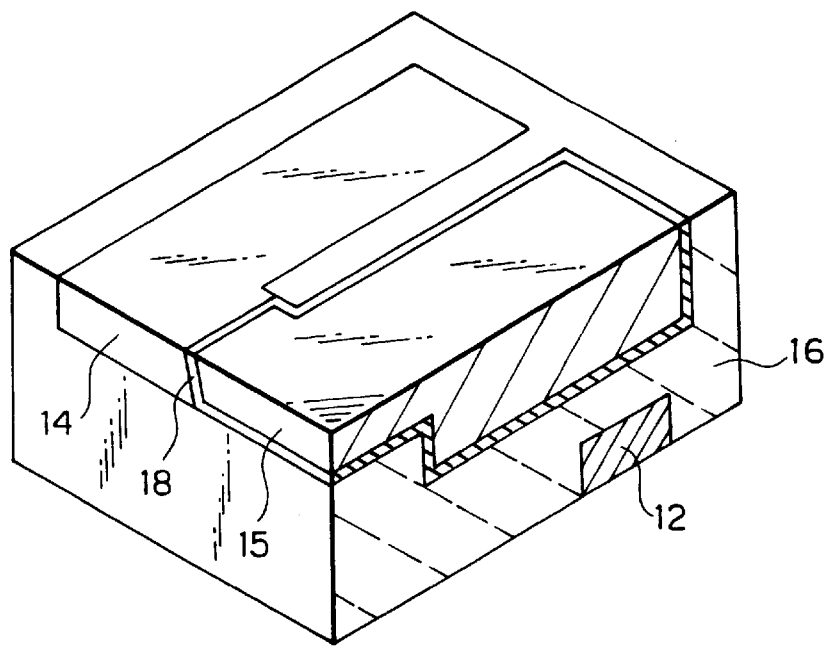
FIG. 16 is a second process drawing following FIG. 15 of a manufacturing process of a magnetic recording/reproducing head.

Then, as identical as the process shown in FIG. 5 and FIG. 6, the recording magnetic yokes 14, 15 interposed by the recording magnetic gap film 18 are formed on the air bearing surface S side. This state is shown in FIG. 16. With such processes, the recording magnetic yokes 14, 15 having a yoke tip portions 51 of a thickness of about 0.5 μm and a yoke bodies of a thickness of about 1.5 μm can be obtained. Thus, the recording head 22 is completed.

On the above described recording head 22, as identical as the process shown in FIG. 7, an $Al_2O_3$ insulation film 23 and a $SiO_2$ insulation layer 28 are formed in turn. By making use of the $SiO_2$ insulation layer 28, the reproducing magnetic yokes 26, 27 interposed by the reproducing magnetic gap film 30 on the air bearing surface S side are formed. In this case, the reproducing magnetic yokes 26, 27 are etched back by such a method as CMP so as to be identical thickness with that corresponding the yoke body 52. The reproducing magnetic gap film 30 is disposed at a position dislodged along the medium running direction from the recording magnetic gap film 18.

Figure 17:
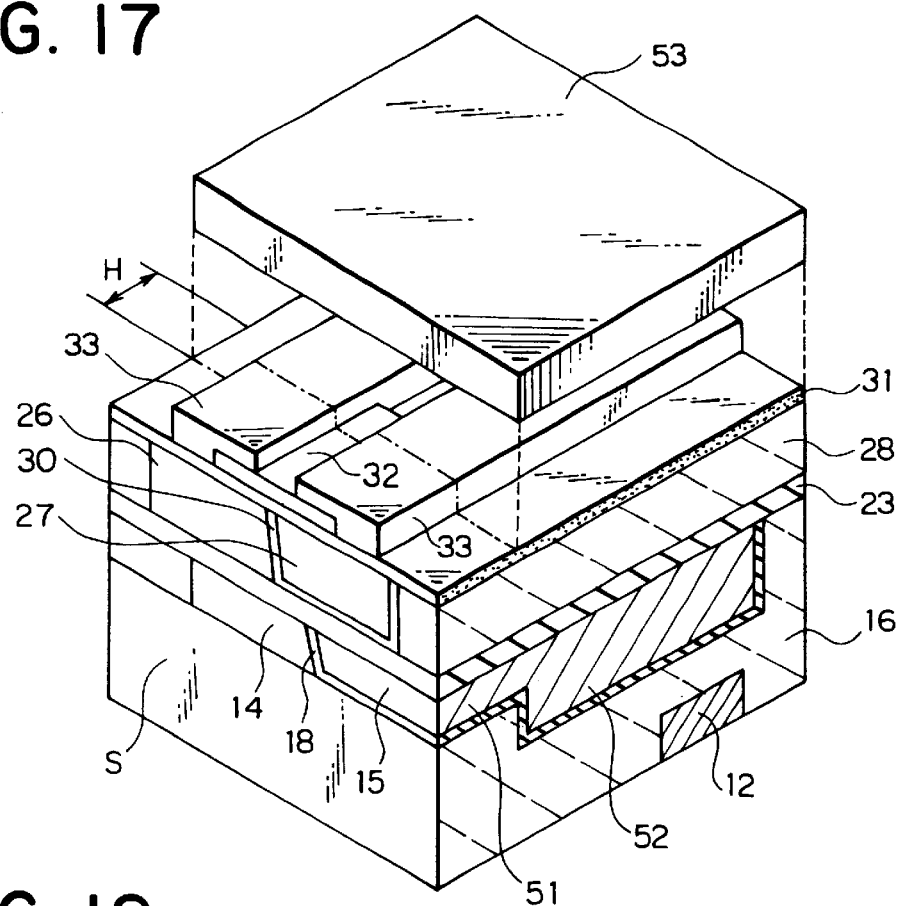
FIG. 17 is a third process drawing following FIG. 16 of a manufacturing process of a magnetic recording/reproducing head.

Next, as identical as the process shown in FIG. 8, an SOG insulation film 31, an MR film 32 consisting of a spin valve film and a lead 33 are formed in turn. This state is shown in FIG. 17. Only the long direction (stripe direction) of the MR film 32 is patterned. Thereafter, in order to restrict a height H of the MR film 32, a mask due to, for example, the photo-resist 53 is formed, the MR film 32 is patterned with the ion-milling method.

Figure 18:
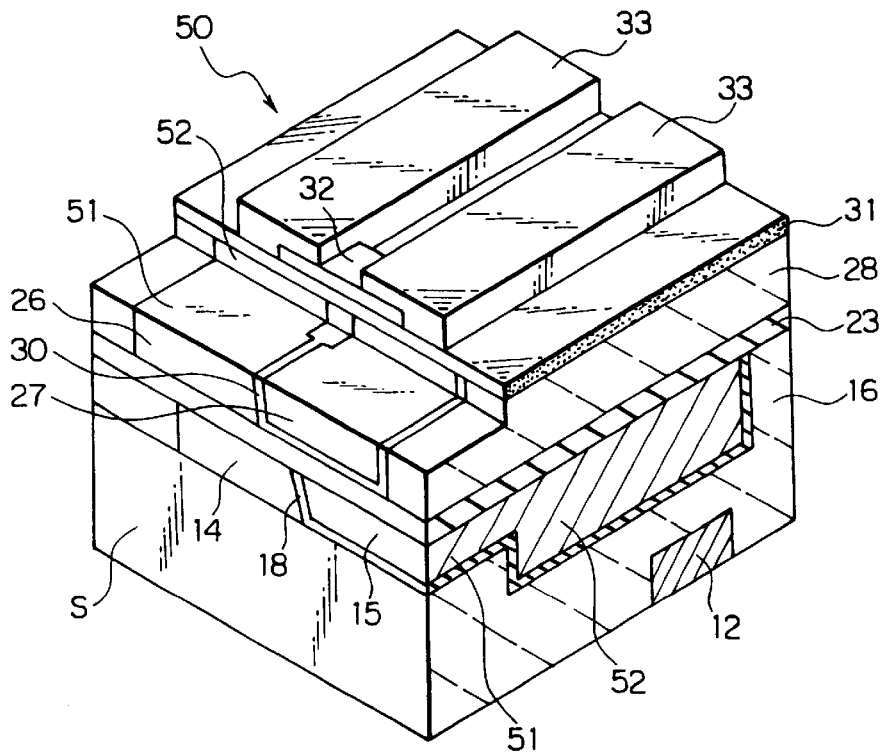
FIG. 18 is a fourth process drawing following FIG. 17 of a manufacturing process of a magnetic recording/reproducing head.

The ion-milling operation is not restricted only to patterning of the MR film 32 to be followed by over-milling up to the reproducing magnetic yokes 26, 27. With this over-milling, the tip portions 51 of the reproducing magnetic yokes 26, 27 are formed. That is, on the air bearing surface S side of the reproducing magnetic yokes 26, 27, the yoke tip portions 51 having thickness corresponding to the width of the reproducing track are formed. This state is shown in FIG. 18. With the above described process, the forming process of the magnetic recording/reproducing separation type head 50 is completed.

When smoothing and restriction of the reproducing track are implemented by, for example, the CMP method, it is difficult to vary the polishing amount (core thickness) only on the air bearing surface side of the magnetic core inside the same head. On the contrary, according to the above described method to over-mill, the yoke tip portion 51 only can be easily rendered to have the thickness corresponding to the reproducing track width. Further, since the yoke tip portion 51 can be formed at the same time with the height restriction of the MR film 32, the manufacturing process can be simplified.

Figure 19:
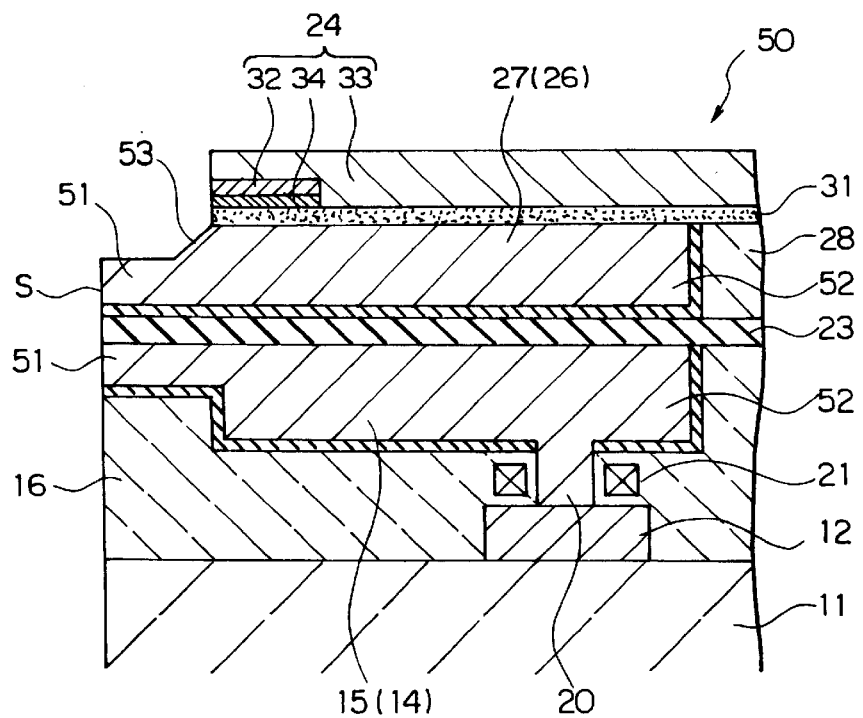
FIG. 19 is a sectional view showing a modification example of a magnetic recording/reproducing head shown in FIG. 13.

Further, by slanting an angle of the ion-milling at, such as, 45°, as shown in FIG. 19, a taper portion 53 can be disposed between the yoke tip portion 51 and the yoke body 52. That is, the thickness can be continually varied between the yoke tip portion 51 and the yoke body 52. According to such a structure, discontinuity of the magnetization becomes difficult to occur.

As the result, occurrence of Barkhausen noise can be suppressed. Also as to the recording magnetic yokes 14, 15, by making the stepped portion 17a of the yoke forming concave portion 17 to have more steps, variation of the core thickness can be made small.

Figure 20:
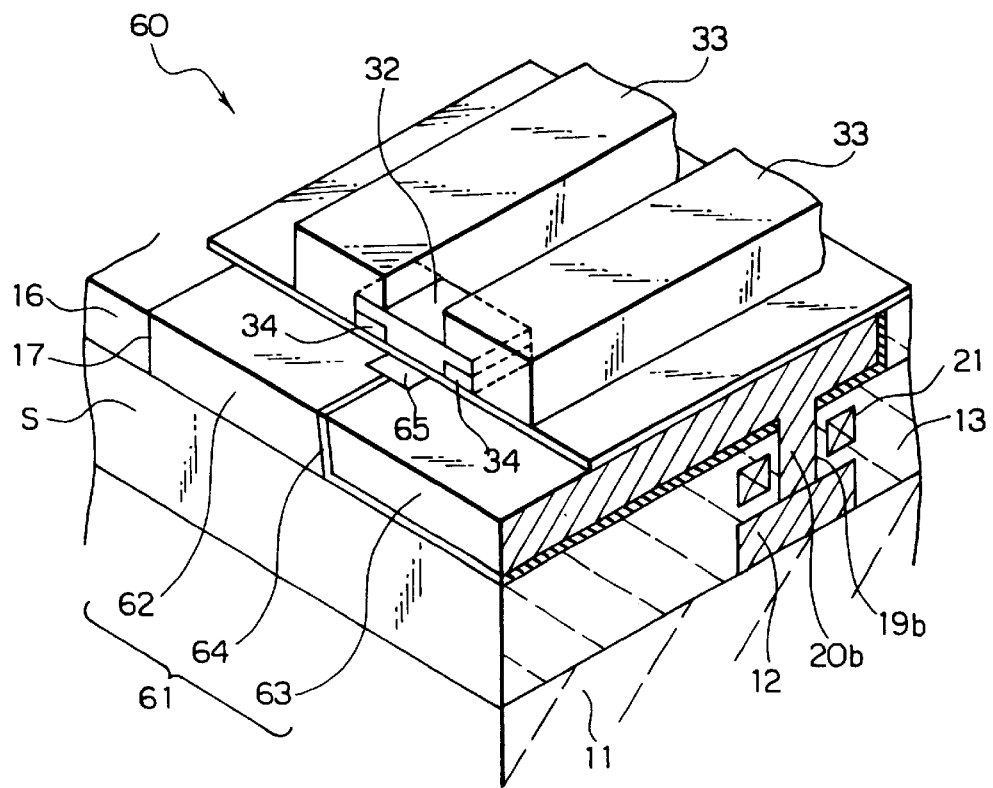
FIG. 20 is a perspective view showing an outline structure of the third embodiment with a partial cross-section, wherein a magnetic head of the present invention is employed in a magnetic recording/reproducing separation type head.
Figure 21:
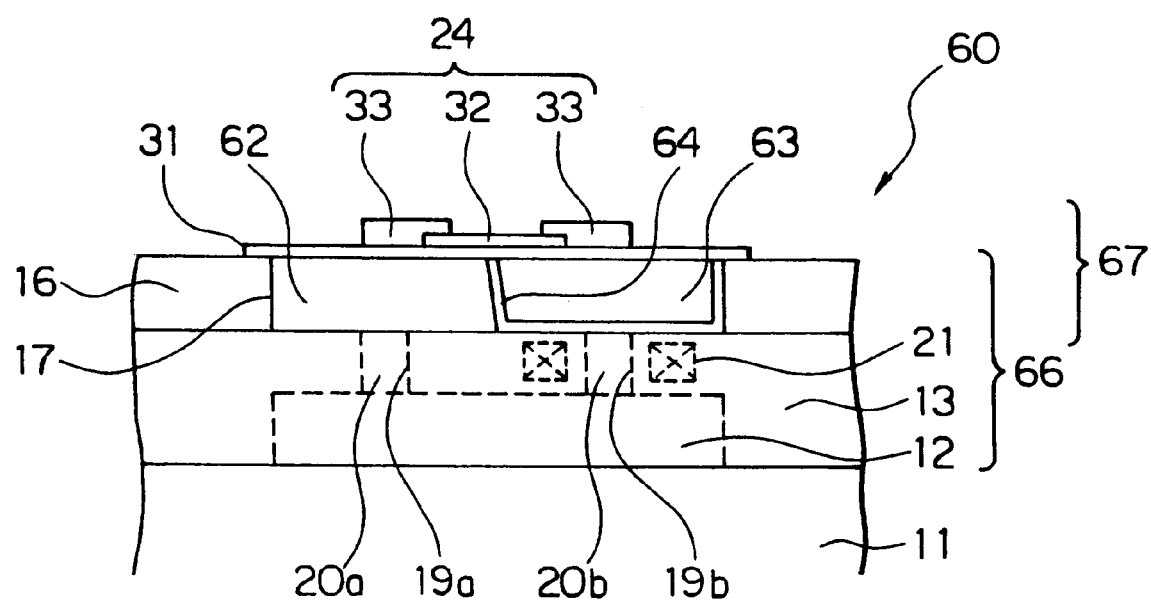
FIG. 21 is a front view of a magnetic recording/reproducing separation type head shown in FIG. 20.

Next, a magnetic recording/reproducing separation type head according to the other embodiment in which a magnetic head of the present invention is applied will be described with reference to FIG. 20 and FIG. 21. FIG. 20 and FIG. 21 are diagrams showing an outline structure of a magnetic recording/reproducing separation type head 60 of the embodiment. FIG. 20 is a perspective view showing the magnetic recording/reproducing separation type head 60 with a cross-section of a part, FIG. 21 is a front view of that seen from the air bearing surface side.

In the magnetic recording/reproducing separation type head 60 shown in these figures, on one main surface of an $Al_2O_3$/TiC substrate 11 having an $Al_2O_3$ insulation film thereon, as identical as the above described embodiment, a back-yoke 12 is formed on the rear side seen from the air bearing surface S. On the back-yoke 12, through an insulation layer 13 consisting of such as $SiO_2$, a magnetic yoke 61 concurrently serving for recording/reproducing is formed. The magnetic yoke 61 which concurrently serves for recording/reproducing can be formed in a stacked manner to prevent eddy-current loss.

The magnetic yoke 61 concurrently serving for recording/reproducing, as identical as the above described manner, possesses a first magnetic yoke 62 and a second magnetic yoke 63, on the air bearing surface S side, a magnetic gap film 64 concurrently serving for recording/reproducing is interposed. The first magnetic yoke 62 and the second magnetic yoke 63 form a pair of magnetic poles. On the rear side of the magnetic gap film 64, a magnetic back-gap 65 is disposed continually therewith.

The first and the second magnetic yokes 62, 63 can be formed as identical manner as that of the recording magnetic yokes 14, 15 of the above described embodiment. That is, the first and the second magnetic yokes 62, 63, so as the main plane thereof to form the same plane almost parallel with the main surface (substrate surface) of the substrate 11, are formed by embedding in the magnetic yoke forming concave portion 17 disposed on the insulation layer 16. Since the thicknesses of these magnetic yokes 62, 63 become the recording track width and the reproducing track width, these thicknesses are set according to the desired track width with the thin film forming technology.

The first and the second magnetic yokes 62, 63 and the back-yoke 12 are, as identical as the above described embodiment, magnetically coupled through the soft magnetic material layers 20a, 20b respectively embedded inside the through holes 19a, 19b. Thereby, a magnetic circuit as the magnetic yoke 61 concurrently serving for recording/reproducing is formed. And, in such a manner as to wind one soft magnetic material layer 20b, the recording coil 21 id disposed. The recording coil 21 is disposed in the $SiO_2$ insulation layer 13. Thereby, the recording head 66 is formed.

As described above, the recording coil 21 is formed along one main surface (lower side main surface) of the magnetic yoke 61 concurrently serving for recording/reproducing. On the opposite side main surface (upper side main surface) from the coil forming plane of the magnetic yoke 61 concurrently serving for recording/reproducing, through the SOG insulation film 31, the MR element 24 is formed. Thus, between the recording coil 21 and the MR element 24, the magnetic yoke 61 concurrently serving for recording/reproducing is interposed.

Constitution of the MR element 24 is identical as that of the above described embodiment. The MR film 32 is, through the SOG insulation film 31, formed on the back-gap 65. On the upper sides of both edge portions of the stripe direction of the MR film 32, a pair of leads 33, and, on the lower sides of both edge portions of the stripe direction, a pair of bias magnetic field inputting films 34 are formed. Further, in FIG. 21, the bias magnetic field inputting film 34 is omitted from drawing. Therewith, a reproducing head 67 is constituted.

In the magnetic recording/reproducing separation type head 60 of the above described embodiment, the magnetic flux generated by energizing the recording coil 21 runs through the first and the second magnetic yokes 62, 63 which are magnetically coupled by the back-yoke 12 and the soft magnetic material layers 20a, 20b to be supplied to the recording medium as a leakage flux from the magnetic gap film 64 concurrently serving for recording/reproducing. Besides, the magnetic flux entered into the first and the second magnetic yokes 62, 63 from the recording medium through the magnetic gap 64 concurrently serving for recording/reproducing is led to the MR film 32, the signal magnetic field can be reproduced. The magnetic yoke 61 concurrently serving for recording/reproducing is effective when combined with a recording medium of a stacked type between the soft magnetic film and the hard magnetic film (keepered media).

In the magnetic recording/reproducing separation type head 60 of the above embodiment, since the recording coil 21 and the MR element 24 are respectively formed along the main plane of the opposite side of the magnetic yoke 61 concurrently serving for recording/reproducing, the magnetic yoke 61 concurrently serving for recording/reproducing works as magnetic shield against the recording coil 21 which can be noise source for the MR element 24. Therefore, the magnetic field generated at the recording coil 21 can be prevented from entering the MR element 24, excellent reproducing characteristics can be obtained by suppressing noise at the reproducing head 67.

Figure 22:
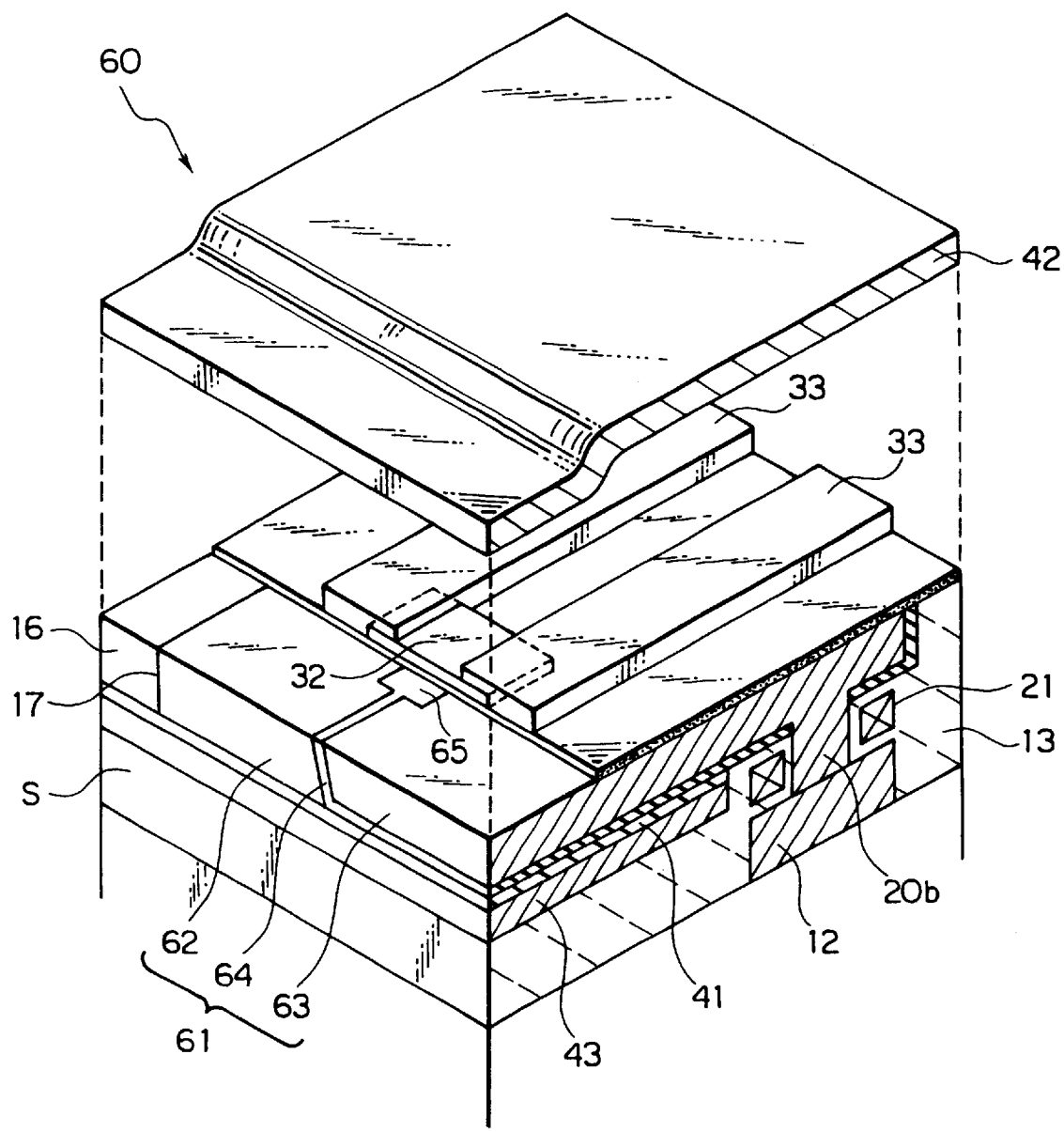
FIG. 22 is a perspective view showing by partly exploding one modification example of a magnetic recording/reproducing separation type head shown in FIG. 20.
Figure 23:
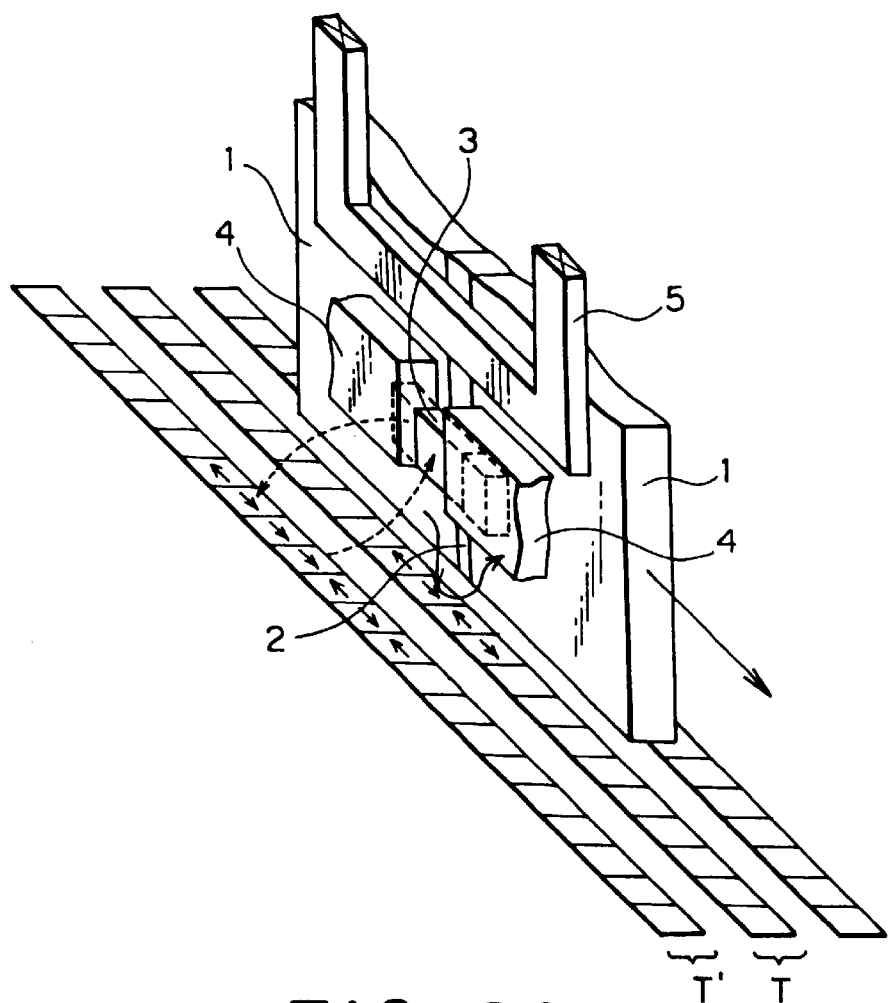
FIG. 23 is a conceptual drawing showing a relative relationship between a structure of a magnetic recording/reproducing separation type head and a recording medium, wherein a conventional yoke type MR head is employed in a magnetic recording/reproducing separation type head.
Figure 24:
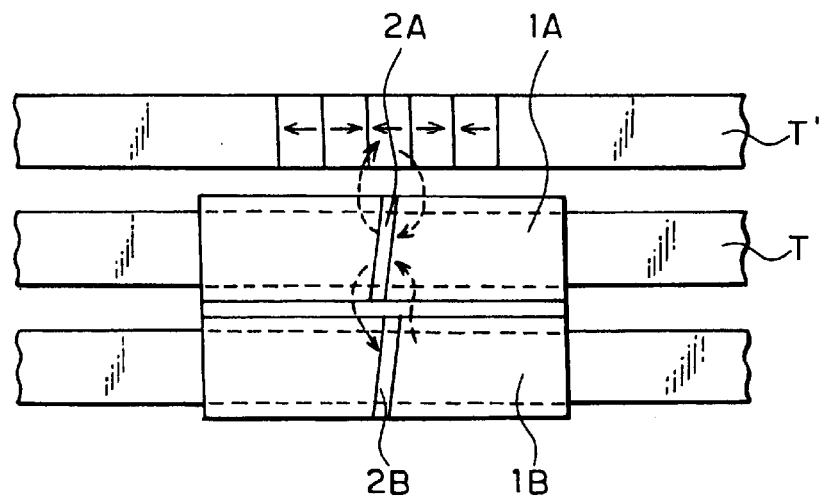
FIG. 24 is a conceptual drawing showing a relative relationship between the other magnetic recording/reproducing separation type head.

In the magnetic recording/reproducing separation type head 60 of the embodiment, as identical as the magnetic recording/reproducing separation type head 10 of the first embodiment, the magnetic shield layer consisting of the soft magnetic layer can be employed. That is, as shown in FIG. 22, on the lower side and the upper side of the magnetic yoke 61 concurrently serving for recording/reproducing, the soft magnetic layers 42, 43 can be respectively disposed. The upper side soft magnetic layer 42 is disposed above the MR element 24. Here, the distance between the magnetic yoke 61 concurrently serving for recording/reproducing and the soft magnetic layers (magnetic shield layer) 43, 42 are made almost identical with, for example, the gap length.

Figure 25:
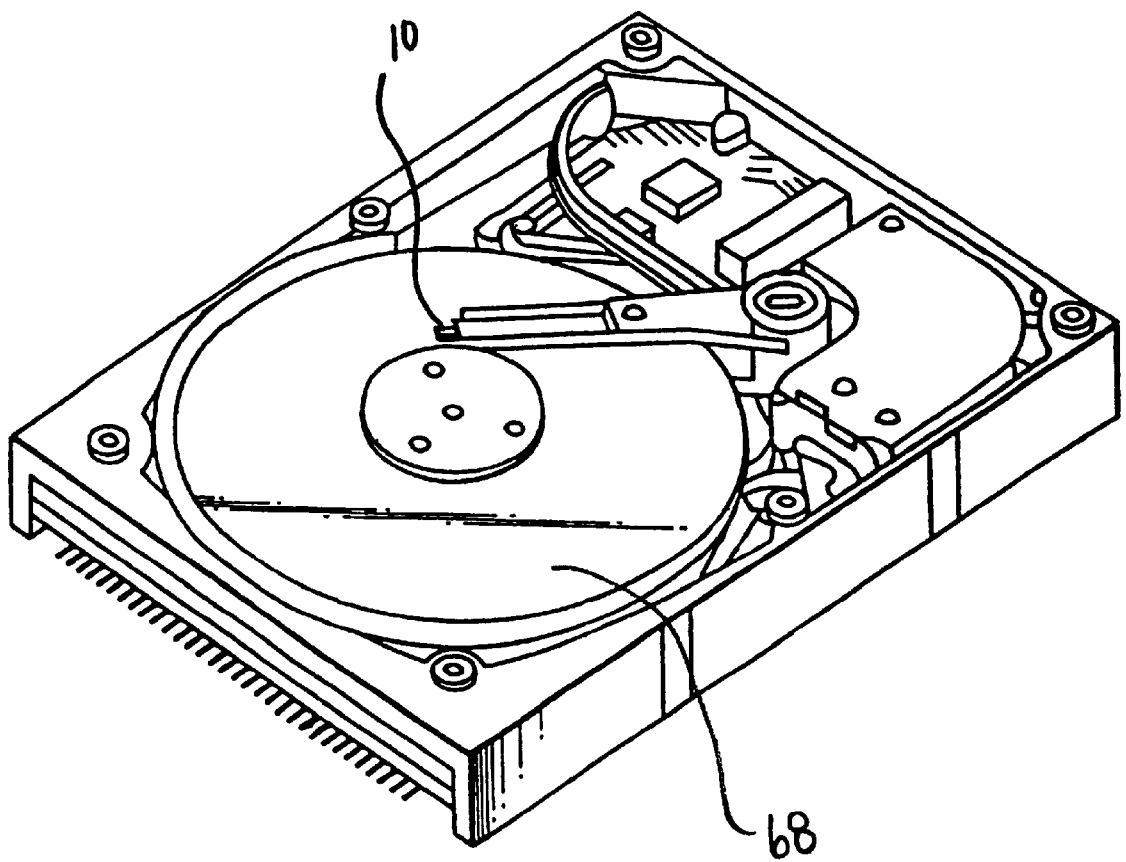
FIG. 25 is a drawing of a magnetic disk unit.

FIG. 25 shows recording head 10 and a recording medium 68 in a magnetic disk unit. Any of the magnetic heads described above may be used in the unit.

As described above, according to the magnetic head of the present invention, entering of the magnetic flux from the recording coil, the neighboring track, the recording magnetic gap film and the like to the magneto-resistance effect element can be suppressed to suppress noise occurrence due to them. Therefore, excellent reproducing sensitivity can be obtained. In addition, as to the recording head, occurrence of recording fringe can be suppressed. Thus, a magnetic head capable of responding to high recording density can be provided.

What is claimed is:

1. A magnetic head, comprising:
   at least a pair of magnetic cores having an air bearing surface, a first side, and a second side opposite to the first side;
   a magnetic gap film interposed between the pair of magnetic cores on the side of the air bearing surface;
   a magneto-resistance effect element in which a signal magnetic flux is led from a recording medium through the pair of magnetic cores, the magneto-resistance effect element being disposed along the first side of the pair of magnetic cores; and
   a recording coil supplying a recording magnetic flux to the recording medium through the pair of magnetic cores, the recording coil having at least one coil disposed along the second side of the pair of magnetic cores.

2. The magnetic head as set forth in claim 1:
   wherein, the pair of magnetic cores are disposed in such a manner that each of said first and second sides thereof constitutes an identical plane almost parallel with a running direction of a recording medium.

3. The magnetic head as set forth in claim 1, further comprising:
   a ferromagnetic layer which is disposed on extension of a film plane of the magnetic gap film and has a film plane having a perpendicular direction component with respect to a film plane of the magnetic gap film.

4. The magnetic head as set forth in claim 1:
   wherein, the pair of magnetic cores comprises a magnetic yoke concurrently serving for recording/reproducing having the magnetic gap film concurrently serving for recording/reproducing.

5. A magnetic disc unit, comprising:
   a magnetic recording medium; and
   a magnetic head recording a signal to the medium through a magnetic field and reproducing a signal through a magnetic field generated from the medium, the magnetic head comprising:

at least a pair of magnetic cores having an air bearing side, a first side, and a second side opposite to the first side, a magnetic gap film interposed between the pair of magnetic cores on the air bearing side, a magneto-resistance effect element disposed along the first side of the pair of magnetic cores, and a recording coil having at least one coil disposed along the second side of the pair of magnetic cores.

* * * * *

UNITED STATES PATENT AND TRADEMARK OFFICE
CERTIFICATE OF CORRECTION

PATENT NO. : 6,285,531 B1
DATED : September 4, 2001
INVENTOR(S) : Yuichi Ohsawa et al.

It is certified that error appears in the above-identified patent and that said Letters Patent is hereby corrected as shown below:

Column 2,
Line 20, insert -- head. -- after "...recording".

Column 5,
Line 55, change "FIG. 12" to -- FIG. 2 --.

Column 6,
Line 24, change "13" to -- 18 --.

Column 7,
Line 37, change "magneto-resistance" to -- mageto-resistance --.

Column 9,
Line 22, change "Keep" to -- keep --;
Line 53, change "film" to -- films --.

Column 11,
Line 38, delete "interposed by" and insert -- disposed between --.

Column 12,
Line 16, change "yoke" to -- yokes --.

Column 13,
Line 5, delete "an".

Column 15,
Line 14, change "id" to -- is --.

Signed and Sealed this

First Day of October, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,285,531 B1
APPLICATION NO. : 09/040353
DATED : September 4, 2001
INVENTOR(S) : Yuichi Ohsawa et al.

It is certified that error appears in the above-identified patent and that said Letters Patent is hereby corrected as shown below:

Column 2,
Line 20, insert -- head. -- after "...recording".

Column 5,
Line 55, change "FIG. 12" to -- FIG. 2 --.

Column 6,
Line 24, change "13" to -- 18 --.

Column 7,
Line 37, change "magneto-reistance" to -- magneto-resistance --.

Column 9,
Line 22, change "Keep" to -- keep --;
Line 53, change "film" to -- films --.

Column 11,
Line 28, delete "interposed by" and insert -- disposed between --.

Column 12,
Line 16, change "yoke" to -- yokes --.

Column 13,
Line 5, delete "an".

UNITED STATES PATENT AND TRADEMARK OFFICE
CERTIFICATE OF CORRECTION

PATENT NO.         : 6,285,531 B1
APPLICATION NO. : 09/040353
DATED              : September 4, 2001
INVENTOR(S)       : Yuichi Ohsawa et al.

It is certified that error appears in the above-identified patent and that said Letters Patent is hereby corrected as shown below:

Column 15,
Line 14, change "id" to -- is --.

This certificate supersedes Certificate of Correction issued October 1, 2002.

Signed and Sealed this

Fourth Day of September, 2007

JON W. DUDAS
*Director of the United States Patent and Trademark Office*